United States Patent
Kozee et al.

(10) Patent No.: US 7,147,801 B2
(45) Date of Patent: Dec. 12, 2006

(54) INK JET INK COMPOSITION AND METHOD FOR SECURITY MARKING

(75) Inventors: Michael Kozee, Wheaton, IL (US); Steven D. Looman, Wheaton, IL (US); John P. Folkers, Palatine, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 10/800,426

(22) Filed: Mar. 12, 2004

(65) Prior Publication Data

US 2004/0220298 A1 Nov. 4, 2004

Related U.S. Application Data

(60) Provisional application No. 60/453,940, filed on Mar. 13, 2003.

(51) Int. Cl.
C09D 11/00 (2006.01)

(52) U.S. Cl. ............ 252/301.16; 252/700; 252/301.36; 427/8; 427/157; 523/160; 523/161; 106/31.64; 106/31.15; 106/31.16; 106/31.32; 428/29; 428/199; 382/135; 382/137; 382/163; 382/321; 283/95; 283/92

(58) Field of Classification Search ............ None
See application file for complete search history.

(56) References Cited

U.S. PATENT DOCUMENTS

| | | | |
|---|---|---|---|
| 3,060,429 A | 10/1962 | Winston | |
| 3,298,030 A | 1/1967 | Lewis et al. | |
| 3,373,437 A | 3/1968 | Sweet et al. | |
| 3,416,153 A | 12/1968 | Hertz et al. | |
| 3,673,601 A | 6/1972 | Hertz | |
| 4,008,085 A | 2/1977 | Lemahieu et al. | |
| 4,659,649 A | 4/1987 | Dickinson et al. | |
| 4,711,832 A | 12/1987 | Gruenbaum et al. | |
| 4,933,377 A | 6/1990 | Saeva et al. | |
| 5,028,792 A * | 7/1991 | Mullis | 250/474.1 |
| 5,099,132 A | 3/1992 | Ueno et al. | |
| 5,102,771 A | 4/1992 | Vogel et al. | |
| 5,221,590 A | 6/1993 | Bugner | |
| 5,296,275 A * | 3/1994 | Goman et al. | 428/29 |
| 5,314,785 A | 5/1994 | Vogel et al. | |
| 5,364,740 A | 11/1994 | Fohrenkamm et al. | |
| 5,395,432 A | 3/1995 | Nelson et al. | |
| 5,411,835 A | 5/1995 | Brinser | |

(Continued)

FOREIGN PATENT DOCUMENTS

EP 0 465 124 A 1/1992

(Continued)

*Primary Examiner*—C. Melissa Koslow
(74) *Attorney, Agent, or Firm*—Leydig Voit & Mayer, Ltd.

(57) ABSTRACT

Disclosed is an ink composition suitable for ink jet printing comprising a luminescent compound, a solvent, and an energy active compound, and optionally a non-luminescent colorant. The energy active compound, when exposed to energy, generates one or more active species that can react with the luminescent compound to alter one or more of the characteristics of the luminescent compound. The luminescent compound can be colored or colorless. Also disclosed is a method for marking substrates comprising providing a mark comprising a luminescent compound and an energy active compound. Further disclosed is a jet ink composition suitable for printing on substrates authentication or security marks which can be rendered unreadable. The luminescence of the mark is quenched and the visible color is changed when irradiated with a light.

140 Claims, 2 Drawing Sheets

U.S. PATENT DOCUMENTS

| | | |
|---|---|---|
| 5,436,115 A | 7/1995 | Mullis |
| 5,470,994 A | 11/1995 | Saeva et al. |
| 5,516,362 A * | 5/1996 | Gundjian et al. ........ 106/31.32 |
| 5,542,971 A | 8/1996 | Auslander et al. |
| 5,569,317 A | 10/1996 | Sarada et al. |
| 5,693,693 A | 12/1997 | Auslander et al. |
| 5,702,511 A * | 12/1997 | de Saint-Romain et al. ........ 106/31.32 |
| 5,716,754 A | 2/1998 | Arnost et al. |
| 5,721,287 A | 2/1998 | Nohr et al. |
| 5,786,509 A | 7/1998 | Belding et al. |
| 5,811,530 A | 9/1998 | Arnost et al. |
| 5,837,042 A | 11/1998 | Lent et al. |
| 5,837,586 A | 11/1998 | Perron |
| 5,939,468 A * | 8/1999 | Siddiqui ........................ 523/161 |
| 6,015,621 A | 1/2000 | Lischewski et al. |
| 6,100,009 A | 8/2000 | Obayashi et al. |
| 6,127,073 A | 10/2000 | Nohr et al. |
| 6,228,157 B1 | 5/2001 | Nohr et al. |
| 6,235,095 B1 | 5/2001 | Nohr et al. |
| 6,329,120 B1 | 12/2001 | Obayashi et al. |
| 6,329,121 B1 | 12/2001 | Obayashi et al. |
| 6,335,531 B1 | 1/2002 | Somerville et al. |
| 6,376,149 B1 | 4/2002 | Grober et al. |
| 6,402,986 B1 | 6/2002 | Jones, II et al. |
| 6,441,380 B1 | 8/2002 | Lawandy |
| 6,504,161 B1 | 1/2003 | Jackson et al. |
| 6,524,379 B1 | 2/2003 | Nohr et al. |
| 2003/0112423 A1 | 6/2003 | Vig et al. |

FOREIGN PATENT DOCUMENTS

| | | |
|---|---|---|
| WO | WO 01/04221 A | 1/2001 |

* cited by examiner

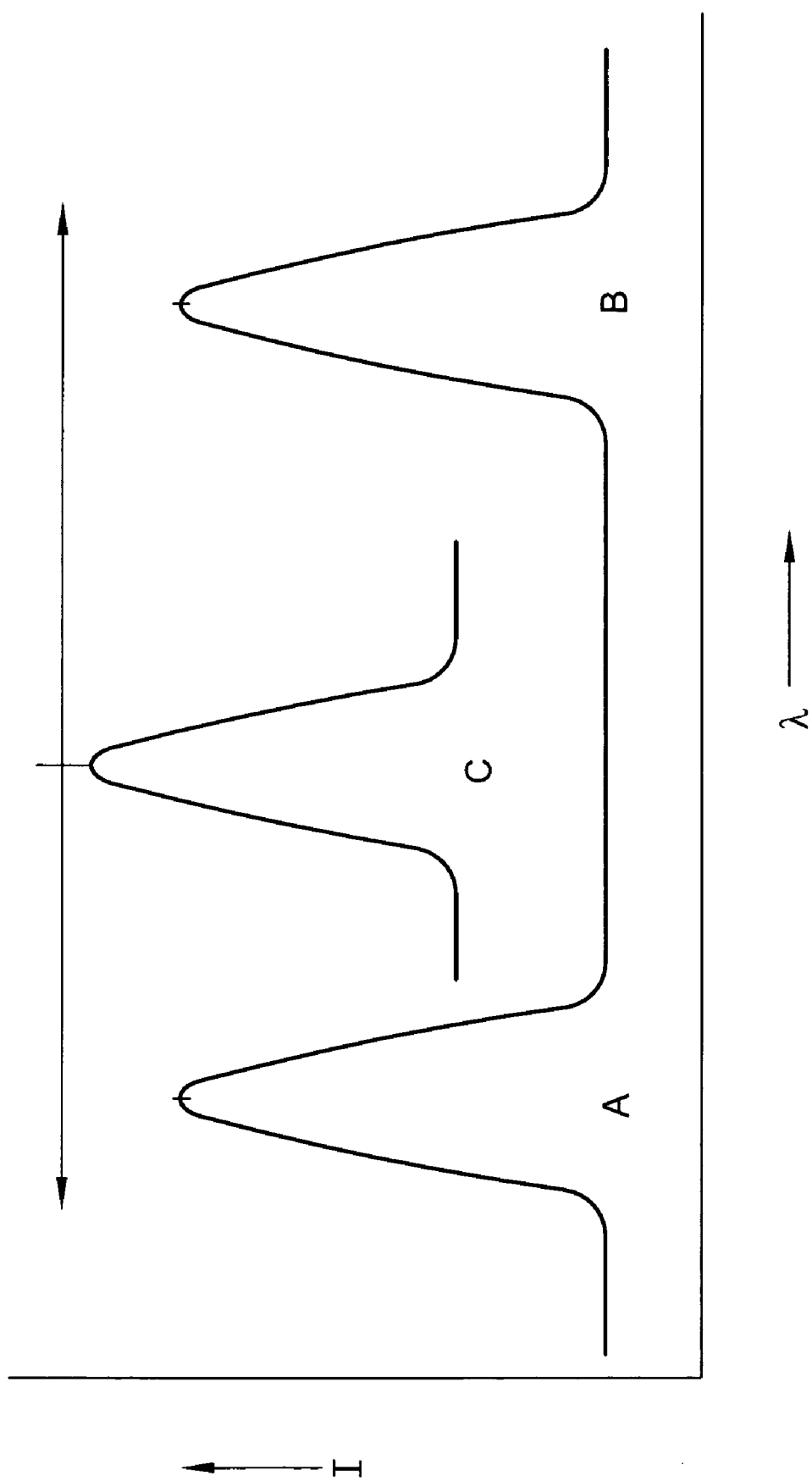

INK JET INK COMPOSITION AND METHOD FOR SECURITY MARKING

CROSS-REFERENCE TO RELATED PATENT APPLICATION

This patent application claims the benefit of U.S. Provisional Patent Application No. 60/453,940, filed Mar. 13, 2003, the disclosure of which is incorporated by reference.

FIELD OF THE INVENTION

This invention pertains to ink jet ink compositions containing a colorant or a luminescent compound and an energy active compound, for example, a photoactive material. The ink jet ink composition is useful for printing marks on substrates, the marks, when exposed to an effective amount of energy, undergo a change such that, for example, the colorant changes luminescence or the luminescent compound is changed. The present invention also pertains to a composition and a method for providing a security mark on substrates such as metal, glass, and plastics, and to a composition and a method for rendering a luminescent, e.g., fluorescent, mark on a substrate unreadable along with a simultaneous color change, thereby allowing for visual verification of the change.

BACKGROUND OF THE INVENTION

Inks have been used to mark items for a number of purposes, for example, for determining their authenticity. Such markings, e.g., covert markings, are used, for example, to identify goods that are intended for sale in a particular market. These markings are intended to prevent profit through the selling of goods for higher margins in a higher value market that were originally distributed for sale in a lower value market. Covert marking applications typically require that the markings are both invisible to the human eye and completely irreproducible in the event that the marking is discovered. It is often desirable after such security features are read that the security feature can be deactivated. The ready and predictable deactivation of a mark lends to the security of the system incorporating that mark for a number of reasons. First, it is an added feature of the mark that lends to the irreproducibility (or unauthorized reproduction) of the mark. Second, by the deactivation, the marks are not transferable to other items or locations after their intended use within the security network. Third, the information contained in the mark is destroyed and cannot be read or reproduced by unauthorized parties.

The deactivation of the security feature may denote one of several events. An example of such an event would be to inform the holder of an article that the article is no longer intended for sale in a given market. Still another reason to deactivate a mark would be to render an article valueless after it has been redeemed for cash value.

Markings are also desirable for process control in production or distribution environments. For example, articles may be sorted by reading their identifying markings at very high throughput speeds in centralized distribution facilities. In production processes, it may be desirable to distinguish articles that have undergone one process from articles that have undergone another process. Another example of process control would be for process monitoring. For example, one commonly used process control ink serves as an indicator on sealed containers of products that distinguishes containers that have undergone a sterilization process from those which have not undergone such sterilization process. These processes could be, for example, either steam induced or ultraviolet light induced. The ink marks typically change color and provide a visual indication that an article has passed the process. Such visual monitoring could require the employment of a line operator to monitor the products online. There is a need for machine-readable inks and marks that indicate the progress of such processes.

In addition to the alteration of a machine-readable component, a visibly changing component might be desirable for certain applications where no machine readability is possible. Currently available marking systems that provide both a visual and a fluorescent indicator require two separate inks each with their own applicator. It would be desirable for the design of an ink that could be used for these multiple purposes—e.g., color change and luminescence change—to have both the colored component and the fluorescent colorant (e.g., dye) together in a single system. It would be further desirable that the changes in the two dyes occur simultaneously. This would allow for the application of the mark on production lines using a single applicator, such as an ink jet ink printer. The use of a single fluid with a single applicator is highly desirable in the design of a security system so that any breech in the integrity of the system—i.e., fluids that are stolen for use elsewhere—can be quickly identified.

One manner in which the value or process status of an item could be changed via a luminescent or colored mark would be to render the mark unreadable. One method to accomplish this would be to discolor, burn, or otherwise destroy the mark by applying energy to it. Conventional dyes or pigments would not necessarily react with the applied energy directly. The degree to which these would react with applied energy would depend on their inherent stability. The decomposition of many organic substances can be brought about thermally with temperatures beneath about 600° C. Many substrates, namely plastics and paper, begin to decompose at temperatures in excess of about 150° C. The heat sources typically used are radiative sources composed of filaments that must be heated through input of electrical energy. These sources are slow to respond to demands for energy and are usually operated in practice in a semi-powered ready mode from which they can be made operational more quickly. These units are impractical for some automated processes, such as sorting on a production line, due to the continuous need for power in ready mode and low efficiency via radiative heat loss. There exists a need for a system which requires less energy to operate By way of background, attempts have been made in general to provide security markings, see, for example, U.S. Pat. Nos. 6,441,380; 6,402,986; and 5,837,042. There is a need for a method of providing an authentication mark which can be rendered unreadable and an ink jet ink composition that is suitable for printing on substrates such authentication marks.

The invention provides ink compositions suitable for fulfilling one or more of the above needs. These and other advantages of the invention, as well as additional inventive features, will be apparent from the description of the invention provided herein.

BRIEF SUMMARY OF THE INVENTION

The foregoing needs have been fulfilled to a great extent by the present invention, which provides an ink composition suitable for ink jet printing comprising a luminescent compound, a solvent, an energy active compound, and optionally a non-luminescent colorant. The energy active compound, when exposed to an effective amount of energy, generates one or more active species that can react with the luminescent compound to change one or more of the characteristics of the luminescent compound and/or the non-luminescent colorant. The luminescent compound can be colored or colorless to the unaided eye. The ink compositions may also contain a non-luminescent colorant. The present invention further provides an ink composition suitable for ink jet printing comprising a colorant, a solvent, and an energy active compound. The colorant can be luminescent or non-luminescent. Typically, the exposure to an effective amount of energy is applied to the mark to carry out the described process. An effective amount of energy is determined by the reactivity of the mark and the maximum time that the mark may be exposed to the energy source that is allowed by the application.

The present invention also provides an ink jet ink composition suitable for printing on substrates authentication or security marks that can be rendered unreadable. The present invention provides a mark whose luminescence (fluorescence or phosphorescence) is quenched and the visible color is changed when exposed to energy. The present invention also provides an ink jet ink composition comprising a first colorant which is luminescent (e.g., fluorescent), a second colorant which is pH sensitive, a solvent, a binder resin, and a photoactive acid-releasing compound. The present invention further provides an ink jet ink composition comprising a colorant that is luminescent (e.g., fluorescent), a solvent, a binder resin, and a photoactive acid-releasing compound.

The ink compositions of the present invention may also contain one or more binder resins, and other additives such as humectants, plasticizers, light blockers, surfactants, wetting agents, heat stabilizers, biocides, adhesion promoters, and conductivity agents.

The present invention also provides a process for authenticating a substrate comprising: (a) providing an authenticating mark on the substrate using an ink composition of the invention; (b) reading the authenticating mark; (c) exposing the authenticating mark to an effective amount of energy to generate species that react with the luminescent compound and/or non-luminescent colorant(s) to obtain an energy-exposed authenticating mark; and (d) reading the energy-exposed authenticating mark. The present invention also provides a method for marking substrates comprising providing a mark comprising a luminescent compound and an energy active compound, which energy active compound, when exposed to energy, generates one or more species that react with the luminescent compound to alter an absorption and/or emission characteristic of the luminescent compound. In accordance with the invention, when the reactive species react to alter the luminescent characteristic of the luminescent compound, it can destroy the compound, alter its chemistry, or electronic environment, e.g., it can be converted to the protonated form.

The present invention further provides a method for marking a substrate with a color changeable security mark whose change is verifiable comprising providing a mark containing a non-luminescent (e.g., non-fluorescent) colorant that is visible to the unaided eye and a fluorescent colorant that becomes visible to the unaided eye, due to the luminescent (fluorescent) emission, only when irradiated with a light of a first wavelength, and irradiating the mark with a light of a second wavelength such that the luminescent (fluorescent) emission is quenched and the (non-luminescent) colorant changes in color to provide a visual verification of the quenching of the luminescent (fluorescent) emission. The present invention also provides a system for authenticating a substrate comprising: (a) the ink composition of the invention; (b) an ink jet printer; (c) a substrate; (d) an energy source, e.g., a deactivation energy source; and (e) a reading device.

The foregoing and other advantages of the present invention, as well as additional inventive features, will be apparent from the description of the preferred embodiments of the invention provided herein.

BRIEF DESCRIPTION OF THE DRAWINGS

FIG. 2 illustrates an embodiment of the present invention comprising a luminescent compound and a non-luminescent colorant, wherein the luminescence observed is controlled or varied by a change in a characteristic of the non-luminescent colorant. The x-axis represents the wavelength of absorption or emission. The y-axis represents the intensity of absorption or emission. A and B represent the absorption and emission spectra of the luminescent compound, respectively, and C represents the absorption spectrum of the non-luminescent colorant. When the reactive species from the energy active compound react with the non-luminescent colorant, the position of C can change to a higher wavelength such that the changed absorption can coincide or overlap with B. Alternatively, the position of C can change to a lower wavelength such that the changed absorption can coincide or overlap with A. The change in the position of C is illustrated by the direction of the arrows. In accordance with embodiments of the invention, the position of C (to start with) can be at any wavelength, for example, at a wavelength less than A, greater than B, or between A and B.

DETAILED DESCRIPTION OF THE INVENTION

Figure 1:
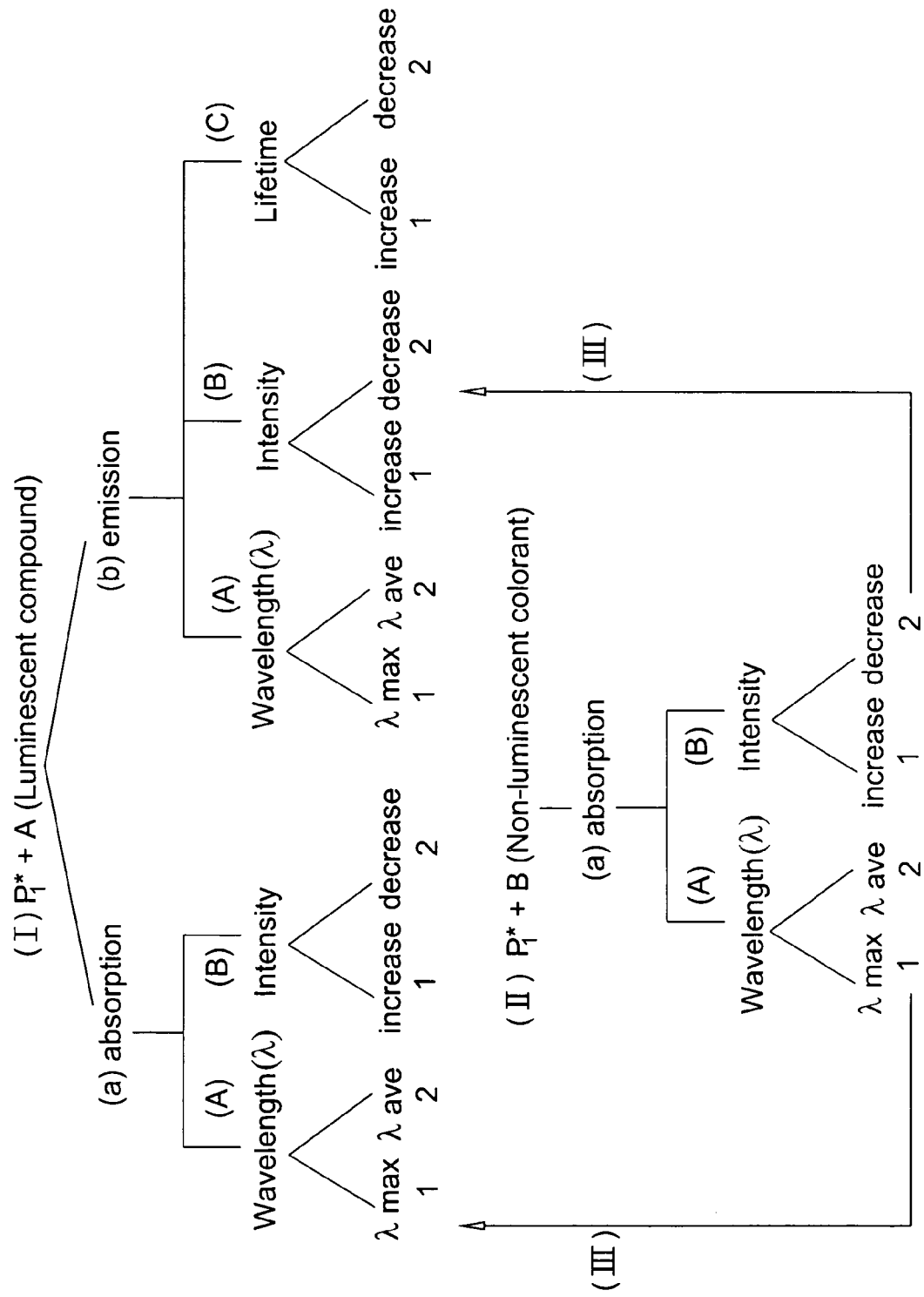
FIG. 1 depicts the various possible reactions or effects that the reactive species produced from the energy active compound can cause with the luminescent compound, (e.g., luminescent colorant), or non-luminescent colorant in accordance with embodiments of the invention. $P_1^*$ is the species produced when the energy active compound is exposed to an effective amount of energy. (I) represents the various reactions or effects the reactive species can undergo with luminescent compound A. (II) represents the various reactions the reactive species can undergo with non-luminescent colorant B. (III) represents the further reactions or effects possible when a luminescent compound and a non-luminescent colorant are present together in the mark.

The present invention provides, in an embodiment, an ink composition suitable for ink jet printing comprising a luminescent compound, a solvent, and an energy active compound. The energy active compound, when exposed to an effective amount of energy, generates one or more active species that can react, or reacts, with the luminescent compound to alter one or more of its properties. The luminescent compound may be colored or colorless. The ink compositions may contain, in addition, a non-luminescent colorant. In another embodiment, the present invention provides an ink composition suitable for ink jet printing comprising a colorant, a solvent, and an energy active compound. The energy active compound, when exposed to an effective amount of energy, generates one or more active species that can react, or reacts, in the mark, with the colorant to alter one or more of its properties. The colorant can be luminescent or non-luminescent.

When the energy active compound is exposed to an effective amount of energy, it generates one or more species that react to alter a characteristic of the colorant and/or the luminescent compound, e.g., luminescent colorant and/or the non-luminescent colorant. Some of the various possible reactions or effects are schematically depicted in FIG. 1. For example, the reaction alters one or more characteristics or properties of the colorant or of the luminescent compound, such as the absorption and/or the emission characteristic. For example, in an embodiment, the reaction alters a wavelength of absorption. The reaction may alter the wavelength of maximum intensity or the wavelength of average intensity. In an embodiment, the reaction can alter the intensity of emission or lifetime of emission. When it alters the wavelength of emission, it may alter the wavelength of maximum intensity of emission or a wavelength of average intensity of emission. The intensity of emission may be increased or decreased. When the reaction alters the lifetime emission, the lifetime may be increased or decreased. In an embodiment, the reaction alters an absorption characteristic of the non-luminescent colorant, for example, a wavelength of absorption or an intensity of absorption.

In a specific embodiment, reaction may alter an absorption characteristic of the luminescent colorant and an absorption characteristic of the non-luminescent colorant; and in some embodiments, reaction may alter an emission characteristic of the luminescent colorant and an absorption characteristic of the non-luminescent colorant. For example, the reaction may alter the intensity of emission of the luminescent colorant, or the wavelength of absorption of the non-luminescent colorant. The reaction may alter an intensity of absorption of the non-luminescent colorant. The reaction may alter the lifetime of emission of the luminescent colorant. The reaction may alter a wavelength of absorption of the non-luminescent colorant or the intensity of absorption of the non-luminescent colorant. If a luminescent colorant and a non-luminescent colorant are present together in a mark, the alteration in the absorption characteristic of the non-luminescent colorant can have a further effect on the absorption or emission characteristic of the luminescent colorant. The quenching of luminescence or the change in luminescence can happen simultaneously and one or more of the photochemical processes can occur independently or together. The luminescent and the colored component in the present invention can be one and the same.

By way of definition, the following is provided. Luminescence is the emission of visible or invisible radiation unaccompanied by high temperature by any substance as a result of absorption of exciting energy in the form of photons, charged particles, or chemical change, and includes fluorescence and phosphorescence. Energetically speaking, fluorescence is defined as the release of photons as a result of electrons passing from the lowest vibrational mode of the singlet molecular excited state to the singlet molecular ground state. These transitions are relatively probable according to the Laporte selection rule and occur very rapidly after electron excitation. Hence, the time interval between excitation and emission—i.e., decay time—is extremely short, typically $10^{-9}$ to $10^{-7}$ second. Phosphorescence, wherein the transition is from the triplet molecular excited state to the singlet state is not allowed by the Laporte rule and is therefore is characterized by time intervals between excitation and reemission from about $10^{-5}$ to $10^{-1}$ seconds, although instances of phosphorescence that take many hours are common for inorganic compounds. The luminescent colorant or compound of the invention can exhibit fluorescence or phosphorescence. Preferably, with phosphorescent compounds, the luminescence will occurr with reasonable quantum yields (i.e., >0.1) within 40° C. of room temperature. More preferably, with phosphorescent compounds, the decay time will lie between $10^{-5}$ and $10^{-2}$ seconds. In accordance with the present invention, the term "colorant" refers to any substance that is visibly colored or a colorless compound which can become colored after a reaction or change.

The fluorescence emission (F) as it is measured spectroscopically for a dilute fluorescent material is related to several parameters by the well known McLaren expansion: $F=K\epsilon\phi bcI$ where $\epsilon$ is the molar absorptivity (extinction coefficient); $\phi$ is the quantum efficiency; b is the path length; c is the fluorophore concentration; I is the radiant intensity of the excitation source; and K is a constant that takes into account all remaining (presumably fixed) instrumental factors. This relationship holds true only for very dilute solutions of a fluorophore and breaks down due to several effects at higher concentrations; e.g., particularly the self-absorption of fluorescent emission by a sample. $\phi$, the ratio of the number of photons emitted to the number of photons absorbed, is typically determined empirically. For most molecules considered to be fluorescent, $\phi$ lies between 0.2 and 0.9. Quenching occurs when excited state electrons relax to the ground state via nonradiative pathways (i.e., non-phosphorescent interstate crossing, intermolecular resonant energy transfer, etc.). Many common environmental molecules may contribute to fluorescence quenching including water and oxygen. It should be understood that the current invention may operate by any of a number of known mechanisms to provide the desired reductions in fluorescence intensity. Some fluorescent molecules are notably pH sensitive. One such example is fluorescein that undergoes a 0.2 decrease in quantum efficiency upon reduction in pH from 9 to 7. The McLaren expansion as defined above will also apply to phosphorescent compounds with relatively short-lived decay times (e.g., higher than $10^{-2}$ seconds). Soluble phosphors with longer decay times, will be broadly influenced by intramolecular processes during electronic relaxation.

The present invention provides both methods and ink jet ink compositions that allow for a luminescent mark to be irreversibly deactivated by its reaction with the energy (e.g., light). The invention also provides for the incorporation into the formulations dyes (either colored or colorless) to provide a visual indication that the mark has been rendered unreadable (hereafter referred to as quenched); or, that might affect the luminescence properties of the mark in a predictable, machine-readable fashion.

In accordance with an embodiment, the present invention provides a method and a composition for rendering a luminescent (e.g., fluorescent) mark unreadable along with a simultaneous color change allowing for visual verification of the color change. An example of such a method for deactivation of a security feature is to destroy the feature entirely. In the case of luminescent chemical dyes or pigments, this would entail altering or destroying the chemical components that are responsible for the luminescence mechanism. Methods, hence, for deactivating a luminescent component would be to cause a chemical reaction leading to alteration or decomposition of the luminescing component to a non-luminescing component. A method for allowing for visual verification of this change is the inclusion of a colorant which undergoes a visual color change under conditions similar to those responsible for rendering the luminescent mark unreadable. Methods for accomplishing this include the incorporation of a colorant which changes visual appearance under said conditions. This may be in the form of a dye or pigment and could incorporate any color change including one color to a different color, colorless to colored, or colored to colorless.

Inks that are intended for application some time after their date of manufacture require that the components remain stable for a reasonable period of time. One way to bring about a change in a solid mark some time after printing is to incorporate into the mark a latent reactive component that can be activated selectively by the application of energy to the mark. Energy may be defined in terms of radiant (electromagnetic) energy that consists of all energy that is typically defined by the electromagnetic spectrum. Radiant energy is often described in terms of the radiant flux density (in Joules per second meter squared or equivalently Watts per square meter) that is a measure of the amount of energy that is applied to planar surface per unit time. Radiant energy is related by Planck's equation to photons that exhibit discrete energies. Based on this relationship, radiant flux can be further defined by specific wavelengths.

One method of applying energy to a marked substrate is to apply radiant energy in the form of ultraviolet light. Ultraviolet radiant energy has several advantages over other longer wavelength radiant energy. For example, some substrates such as low melting plastics might not be able to survive the application of infrared (heat) energy. Ultraviolet radiant energy typically referred to UVB or UVC radiation (from about 200 to 350 nm) is particularly effective. Many chemical compounds non-destructively absorb energy in this region; however, particular photoactive compounds are known to degenerate rapidly as a result of absorbing said energy and will react with other more stable molecules in the medium. Such compounds can be chosen based on their reactivity toward radiant energy. In some applications increased reactivity toward radiant power of a given energy may be desirable and in some applications it may be desirable to select compounds that are less reactive toward radiant power of a given energy.

One general way to increase reactivity of the mark of the invention with radiant energy in a particular wavelength region is to select an appropriate photoactive compound. A photoactive compound may be selected based on its intrinsic chemical reactivity toward incident radiant energy and with prior knowledge of the spectral energy distribution of the radiation source. For example, two well-known classes of energy active compounds are diaryl iodonium salts and triaryl sulfonium salts. Diaryl iodonium salts are considered to be more labile toward radiant energy than triaryl sulfonium salts and will generate a greater concentration of free acid when irradiated. However, when comparing similar sulfonium salts, the reactivity would largely be governed by the cross sections of the incoming radiant power and the molar absorptivity of the salt. For example, triphenyl sulfonium salts (little absorptivity >300 nm) are less active than equivalent amounts of mixed triaryl sulfonium salts (little absorptivity >320 nm) toward conventional high pressure mercury vapor arc lamps which radiate UV energy primarily above 300 nm. To further enhance the reactivity of onium salts toward lower energy light (>320 nm), recognized photosensitizers can be employed, such as anthroquinones or coumarins.

Another means to increase the reactivity of said mark is to provide an energy source that delivers more radiant flux density in the wavelength region where the photoactive compounds are strongly absorbing. For example, the average flux density delivered in the region from 300 to 400 nm by a handheld low-pressure mercury lamp (i.e., Spectroline ENF-260C) is on the order of 1 Watt per square centimeter. An electrodeless high-pressure mercury lamp (e.g., a 300 Watts per inch ultraviolet curing unit from Fusion Systems) might deliver on the order of two to three orders of magnitude higher radiant flux densities. Hence, it could be expected based on the different flux densities that an energy active compound that absorbs primarily in the wavelength region between 300 and 400 nm would react from one to two orders of magnitude more rapidly with the latter energy source.

The energy active compound can be exposed to any suitable form of energy. For example, the energy can be radiant energy in the form of visible light (400 to 700 nm), UV (10 to 400 nm), heat, IR (700 to 10000 nm), X-rays, gamma rays, electron beams, or any combination thereof. Preferred light sources for the present invention include those that emit a large proportion of the source input energy as ultraviolet radiation. Even more preferred are ones that emit primarily UVB (280 to 315 nm) or UVC (100 to 280 nm) radiation and do not necessarily emit UVA (315 to 400 nm) radiation. Of course, the present invention also allows for reaction with light of any energy including near UV, visible, or infrared. Examples of UV sources include but are not limited to the following: excimer lasers; low-pressure mercury lamps; high-pressure (with electrode or electrodeless) mercury lamps; super-high pressure mercury lamps; high-pressure xenon-mercury lamps; high-pressure xenon lamps; low-pressure sodium lamps; high-pressure sodium lamps; LEDs; sunlight; diode lasers; low pressure gas discharge lamps; and vortex stabilized plasma lamps. Examples of visible and IR light emitters include those listed above in addition to the following: blackbody sources such as continuous wave halogen lamps; halogen flash lamps; CO₂ lasers; incandescent lamps; halogen incandescent lamps; and fluorescent tube lamps.

Other suitable energy sources included but are not limited to those commonly used in sterilization processes: i.e., gamma, X-ray or high energy electron beam. In terms of the electromagnetic spectrum energies for these sources are typically defined as of all of the energies with wavelengths shorter than those found for UV energy (i.e., shorter than 10 nm). Even more common is to express the energy for individual particles in terms of electron volts (eV). Suitable source eV ranges are any where from 100 eV (X-rays) to more than 1 MeV (gamma rays). Typical particle energies achieved in electron beam sterilization systems lie between 80 keV and 12 MeV.

Heating of the marks based on these compounds will result in the degeneration or quenching of the luminescent component. Other sources of energy might also serve to activate the components of the formulation. These include but are not limited to electron beam and high-energy excimer lasers.

The present invention provides, in an embodiment, a method and a composition for rendering a luminescent (fluorescent or phosphorescent) mark unreadable along with a simultaneous color change allowing for visual verification of said change. The present invention more specifically provides a formulation and a method that involves the use of the formulation for the accelerated light-induced quenching of a fluorescent or phosphorescent agent and a simultaneous light-induced color change.

The species produced upon exposure of the energy active compound to an effective amount of energy, in an embodiment, comprise an acid. The species, in another embodiment, comprise a radical. The energy active compound in accordance with the present invention is an onium salt, for example, the onium salt comprises an element from Group V, VI, or VII of the periodic table.

In a specific embodiment, the onium salt is selected from the group consisting of diazonium salts, iodonium salts, sulfonium salts, selenonium salts, ammonium salts, sulfoxonium salts, halonium salts, phosphonium salts, arsonium salts, and any combination thereof.

In particular embodiments, the energy active compound is selected from the group consisting of thiophenium salts, silver salts, polyboron acid metal salts, ferrocenium salts, thiopyrilium salts, uranyl compounds or salts, thallium salts, and any combination thereof. In another embodiment, the energy active compound is selected from the group consisting of sulfonated imides, diazomethane compounds, triazine compounds or derivatives, sulfonated esters, disulfones, sulfonated nitrides, oxysulfur salts, nitrosamines, and halogenated compounds, and any combination thereof. In an embodiment, the energy active compound is selected from the group consisting of aryl ketones, quinones, transition metal complexes, metal carbonyl complexes, phosphine oxides, peroxides, $S_xO_y$ salts wherein when x=1, y=3, 4, or 5; when x=2, y=3, 4, 5, 6, 7, or 8; and when x=n+2 (n>0), y=6, and any combination thereof.

Any suitable energy active compound that generates a reactive species can be used. Energy active compounds, e.g., photoactive compounds, suitable for use in the present invention include those that absorb light or heat and react by generating a free acid. The generation of free acid by reaction with light or heat is brought about by using a wide variety of compounds that can be organized into charged (ionic) and uncharged compounds (non-ionic) and further into several more specific groups.

Without wishing to be bound by a theory or mechanism, it is believed that in the case of ionic acid generators, homolytic cleavage results in the generation of a short-lived radical that quickly abstracts a proton from other molecules present. The proton is rapidly transferred to the anionic component of the compound in a rapid dissociation that gives rise to the metastable strong acid species. This species goes on to participate in acid initiated reactive processes. Most non-ionic acid generators consist of a highly acidic leaving group attached to a carbon atom. Photoinitiation generally results in protonation of the molecule at some point (such as the carbon atom) followed by rapid intramolecular reorganization to generate a reactive strong acid. It is important to note that in either mechanism, the energy active compound is consumed in the generation of the reactive species as long as proton-accepting moieties are present. Examples of preferred charged compounds are set forth below.

TABLE 1

Diazonium Salts

| Example | Reference or Source |
|---|---|
| Diazonium fluoroborates | Pappas* pp. 251 |
| Diazonium perchlorates | Pappas pp. 251 |
| Diazonium perfluorocarboxylates | Pappas pp. 251 |
| Diazonium fluorophosphates | Pappas pp. 251 |
| Diazonium phosphotungstanates | Pappas pp. 251 |
| Diazonium phosphomolybdates | Pappas pp. 251 |
| Diazonium tungstogermanates | Pappas pp. 251 |
| Diazonium silicotungstates | Pappas pp. 251 |
| Diazonium molybdosilicates | Pappas pp. 251 |
| Diazonium thiozole derivatives | CGI 1397 to CGI 1311 |

*Pappas, S. Peter, ed. UV Curing: Science and Technology. Volume II; 1985, Technology Marketing Corporation, Norwalk CT.

TABLE 2

Iodonium Salts

| Example | Source |
|---|---|
| Bis(4-tert-butylphenyl)iodonium p-toluenesulfonate | Aldrich |
| Diphenyliodonium-9,10-dimethoxyanthracene-2-sulfonate | Aldrich |
| Diphenyliodonium hexafluorophosphate | Aldrich |
| Diphenyliodonium triflate | Aldrich |
| Bis(4-tert-butylphenyl) iodonium perfluoro-1-butanesulfonate | Aldrich |
| Diphenyliodonium p-toluenesulfonate | Aldrich |
| Diphenyliodonium nitrate | Aldrich |
| Bis(4-tert-butylphenyl) iodonium triflate | Aldrich |
| Diphenyliodonium perfluoro-1-butanesulfonate | Aldrich |
| (4,-methylphenyl)[4-(2-methylppropyl)phenyl]iodonium hexafluorophosphate | CGI552[a] |
| [4-[(2-hydroxytetradecyl)oxy]phenyl]phenyl iodonium hexafluorophosphate | PC-2508[b] |
| Mixed diaryl iodonium hexafluoroantimonate | PC-2506[b] |

[a]Ciba Specialty Chemicals
[b]Polyset Company, Mecahnicville, NY

TABLE 3

Sulfonium Salts

| Example | Source |
|---|---|
| (4-Phenoxyphenyl) diphenylsulfonium triflate | Aldrich |
| (4-Methylthiophenyl) methyl phenyl sulfonium triflate | Aldrich |
| (4-Chlorophenyl)diphenyl) sulfonium triflate | Aldrich |
| 2-Naphthyl diphenylsulfonium triflate | Aldrich |
| (tert-Butoxycarbonylmethoxynaphthyl) diphenylsulfonium triflate | Aldrich |
| Thiobis (triphenyl sulfonium hexafluorophosphate) solution | Aldrich |
| (4-Methoxyphenyl) diphenylsulfonium triflate | Aldrich |
| (4-tert-Butylphenyl) diphenylsulfonium triflate | Aldrich |
| Triphenylsulfonium triflate | Aldrich |
| (4-Fluorophenyl) diphenylsulfonium triflate | Aldrich |
| (4-Methylphenyl) diphenylsulfonium triflate | Aldrich |
| (4-Fluorophenyl) diphenylsulfonium triflate | Aldrich |
| (4-Iodophenyl) diphenylsulfonium triflate | Aldrich |
| (tert-Butoxycarbonyl methoxyphenyl) diphenylsulfonium triflate | Aldrich |
| (4-Phenylthiophenyl) diphenylsulfonium triflate | Aldrich |
| (4-Bromophenyl) diphenylsulfonium triflate | Aldrich |
| Triphenylsulfonium perfluoro-1-butanesufonate | Aldrich |
| Tris(4-tert-butylphenyl) sulfonium triflate | Aldrich |
| Tris(4-tert-butylphenyl) sulfonium perfluoro-1-butanesulfonate | Aldrich |
| Dimethyl(4-naphthol)sulfonium trifluoromethanesulfonate | UR-1106[b] |
| Dimethyl(4,7-dihydroxynaphthalene)sulfonium trifluoromethanesulfonate | UR-1107[b] |
| Dimethyl(4,7-dihydroxynapthalene)sulfonium 10-camphorsulfonate | UR-1113[b] |
| Dimethyl(4,7-dihydroxynapthalene)sulfonium nonafluorobutanesulfonate | UR-1114[b] |
| Dimethyl(4,7-dihydroxynapthalene)sulfonium p-toluenesulfonate | UR-1115[b] |
| Dialkylphenylacylsulfonium salts | Pappas |
| Mixed triaryl sulfonium salts; hexafluorophosphate salts | UVI-6976[a] |
| Mixed triaryl sulfonium salts; hexafluoroantimonate salts | UVI-6992[a] |

[a]DOW Chemical
[b]Midori Kogaku Inc., Ltd.

TABLE 4

Other Useful Onium Salts

| Group | Example |
|---|---|
| Selenonium salts | |
| Selenium salts | |
| Quaternary ammonium salts | |
| Sulfoxonium salts | |
| Halonium salts | |
| Quaternary phosphonium | Tetraphenylphosphonium bromide |
| Quaternary arsonium salts | Tetraphenylarsonium bromide |

Many combination of onium salts are possible from the anions and cations listed in Tables 1∝4. The salts are named in accordance with convention by the cation compound followed by a space and then the anion component. Other anions not on the list are also possible including but not limited to: halogen complex anions of the elements Sb, Sn, Fe, Bi, Al, Ga, In, Ti, Zr, Sc, D, Cr, Hf, Cu, B, P, and combinations thereof; tetraphenyl borate; fluorinated sulfonates of various carbon chain length (i.e.,triflate, nonaflate, etc.); sulfonates o various alkyl carbon chain lengths (i.e., butyl, octyl, etc.); and camphorsulfonate. Other miscellaneous salts that may be useful in the invention are given below.

TABLE 5

Miscellaneous Salts

| Group | Example | Source, Name or Reference |
|---|---|---|
| Thiophenium salts | S-(2-Napthalenecarbonylmethyl)tetrahydrothiophenium p-toluenesulfonate | UR-1116[a] |
| | S-(2-napthalenecarbonylmethyl)tetrahydrothiophenium trifluoromethanesulfonate | UR-1105[a] |
| Silver salts | Boron halide polyhedra | Pappas pp. 251 |
| | Fluorinated alkanesulfonic acid salts | Pappas pp. 251 |
| Polyboron acid metal salts | Metal halide | Pappas pp. 251 |
| | Aromatic halide | Pappas pp. 251 |
| Ferrocenium salts | Ferrocene and TiCl$_4$ | Pappas pp. 251 |
| | Cumene(cyclopentadienyl)iron(II) hexafluorophosphate | Aldrich 40,807-7 |
| Thiopyrylium salts | | Pappas pp. 251 |
| Uranyl compounds | Uranyl nitrate | Pappas pp. 251 |
| Thallium salts | Fluorinated alkanesulfonic acid salts | Pappas pp. 251 |

[a]Available from Midori Kagaku Co., Ltd.

In a specific embodiment, the onium salt is selected from the group consisting of diazonium salts, iodonium salts having at least one aryl group, sulfonium salts having at least one aryl group, and any combination thereof. Preferred photoactive compounds from the group of acid-generating diazonium, onium or other salts include onium salts of sulfur and iodine. Among these, mixed aryl sulfonium salts available commercially as UVI-6976 and UVI-6992 (Dow Chemical) are particularly effective. Other preferred salts include the diaryliodonium salts CGI552 (Ciba Specialty Chemicals) and PC-2506 and PC-2508 (Polyset Company). These salts show very high reactivity toward radiant energy.

Nonionic energy active (acid generating photoactive) compounds are also suitable for this invention. Examples of photoinduced acid generating compounds are sulfonated imides, diazomethane compounds, triazines, sulfonated esters, and disulfones. Examples of these compounds are given below.

TABLE 6

Sulfonated Imides

| Example | Source |
| --- | --- |
| N-Hydroxynaphthalimide triflate | Aldrich #53108-1 |
| N-Hydroxy-5-norbornene-2,3-dicarboximide sulfonates | Aldrich #53108-1; NDI 101 to NDI-109[a] |
| N-Hydroxyphthalimide triflate | Aldrich |
| Naphtalimidyl sulfonates | NAI-100, 105, 106, 109[a] |
| Succinimidyl sulfonates | SI-101, 105, 106, 109[a] |

[a]Available from Midori Kagaku Co., Ltd.

TABLE 7

Diazomethanes

| Example | Source |
| --- | --- |
| Bis(cyclohexylsulfonyl)diazomethane | UR-1200[a] |
| Bis(benzensuflonyl)diazomethane | UR-1201[a] |
| Bis(2,4-dimethylbenzenesulfonyl)diazomethane | UR-1202[a] |
| Bis(4-chlorobenzenesulfonyl)diazomethane | UR-1203[a] |
| Bis(4-methoxybenzenesulfonyl)diazomethane | UR-1204[a] |

[a]Available from Midori Kagaku Co., Ltd.

TABLE 8

Triazine Derivatives

| Example | Source |
| --- | --- |
| 2-(4-Methoxystyryl)-4,6-bis(trichloromethyl)-1,3,5-triazine | Aldrich #530964 |
| Tris[trichloromethyl]s-triazine | TAZ-101[a] |
| p-methoxyphenyl[bis(trichloromethyl))]-triazine | TAZ-104[a] |
| 2,4,6-tris(2,4,6-tribromophenoxy)-1,3,5-triazine | Dead Sea Bromine Group |

[a]Available from Midori Kagaku Co., Ltd.

TABLE 9

Miscellaneous Sulfonated Esters

| Example | Reference or Source |
| --- | --- |
| 2,1,4-diazonapthoquinone sulfonic acid esters | U.S. Pat. No. 5,827,634 |
| 2,1,5-diazonapthoquinone sulfonic acid esters | U.S. Pat. No. 5,827,634 |
| Sulfonoxy ketones | U.S. Pat. No. 5,827,634 |
| Benzoin tosylate | U.S. Pat. No. 5,827,634 |
| t-butylphenyl alpha-(p-toluenesulfonyloxy)-acetate | U.S. Pat. No. 5,827,634 |
| t-butyl alpha-(p-toluenesulfonyloxy)-acetate | U.S. Pat. No. 5,827,634 |
| Sulfonated nitride derivatives | CGI26x family; PAI-101, 106, 1001[a] |
| 4-bromo-2,6,-dimethylphenol sulfonic acid esters | U.S. Pat. No. 5,827,634 |
| [1,2,3-trismethanesulfonate]benzene | PYR-100[b] |

[a]Ciba Specialty Chemicals
[b]Available from Midori Kagaku Co., Ltd.

TABLE 10

Halogenated Compounds

| Example | Reference or Source or CAS# |
| --- | --- |
| 1,1-bis[p-chlorophenyl]-2,2,2-trichlorothane | U.S. Pat. No. 5,827,634 |
| 1,1-bis [p-methoxyphenyl]-2,2,2-trichloroethane | U.S. Pat. No. 5,827,634 |
| 4,4,-dichloro-2-(trichloromethyl) benzhydrol | U.S. Pat. No. 5,827,634 |
| 2-chloro-6-(trichloromethyl) pyridine | U.S. Pat. No. 5,827,634 |
| hexachlorodimethylsulfone | U.S. Pat. No. 5,827,634 |
| O,O-diethyl-O-(3,5,6-trichloro2-pyridyl)phosphorothionate | U.S. Pat. No. 5,827,634 |
| 1,2,3,4,5,6-hexachlorocyclohexane | U.S. Pat. No. 5,827,634 |
| N(1,1-bis [p-chlorophenyl]-2,2,2-trichloroethyl)acetamide | U.S. Pat. No. 5,827,634 |
| 2,2,-bis[p-chlorophenyl]-1,1-dichloroethylene | U.S. Pat. No. 5,827,634 |
| Chloroform | Aldrich |
| 1,2,5,6,9,10-hexabromocyclododecane | U.S. Pat. No. 5,827,634 |
| 1,10-dibromodecane | U.S. Pat. No. 5,827,634 |
| Tris[2,3-dibromopropyl]isocyanurate | U.S. Pat. No. 5,827,634 |
| Iodoform | Aldrich |
| Bromoform | Aldrich |
| 2,2,2-tribromoethanol | Aldrich |
| 2,3-dibromopropionitrile | Aldrich |
| 1,2-dibromocyclohexane | Aldrich |
| Tribromoneopentyl alcohol | Dead Sea Bromine Group |
| Perfluoroheptane | Aldrich |
| methyl bromide | |
| methylene bromide | |
| bromochloromethane | |
| ethylene dibromide | |
| n-amyl bromide | |
| benzylbromoacetate | |
| bromoacetic acid | |
| bromoacetyl bromide | |
| 2-bromobutyric acid | |
| Allyl bromide | |
| 3-bromo-3-butene-1-ol | |
| 1-bromo-3-chloropropane | |
| 2-bromoproprionic acid | |
| 3-bromoproprionic acid | |
| 5-bromovaleric acid | |
| Trans-bromostyrene | |
| n-butyl bromide | |
| Cetyl bromide | |
| Cetylpyridinium bromide | |
| Cyclopropyl bromide | |
| Cyclo-propylmethyl bromide | |
| 1,4-dibromobutane | |
| 1,3-dibromopropane | |
| 2,3-dibromopropane-1-ol | |
| Ethyl bromide | |
| Ethyl bromoacetate | |
| n-hexyl bromide | |
| Isobutyl bromide | [78-77-3] |
| Isopropyl bromide | [75-26-3] |
| Octyl bromide | [111-83-1] |
| n-propyl bromide | [106-94-5] |
| 1,1,2,2-tetrabromoethane | [79-27-6] |
| Vinyl bromide | |
| Bromobenzene | |
| 4-bromobenzyl cyanide | |
| Bromo-2,4-difluorobenzene | |
| 2,4,6-tribromoaniline | |
| 2,4,6-tribromophenol | |
| Bromamine acid, 1-amino-4-bromoanthraqinone-2-sulfonic acid | |
| Bis-(2-ethylhexyltetrabromophthalate) | [26040-51-7] |
| Bis(methyl)tetrabromophthalate | [55481-60-2] |
| Bis(tribromophenoxy)ethane | [37853-59-1] |
| Brominated trimethylphenylindane | [155613-93-7] |
| Decabromobiphenyl | [13654-09-6] |
| Decabromodiphenyl ether | [1163-19-5] |
| Decabromodiphenylethane | [137563-36-1] |
| Dibromoethyldibromocyclohexane | [3322-93-8] |
| Ethylenebisdibromonorbonanedicarboximide | [52907-07-0] |
| Ethylenbis(tetrabromophthalimide) | [32588-76-4] |

TABLE 10-continued

Halogenated Compounds

| Example | Reference or Source or CAS# |
|---|---|
| Octabromodiphenyl ether | [32536-52-0] |
| Pentabromotoluene | [87-83-2] |
| Tetrabromobisphenol A bis(2,3-dibromopropyl ether) | |
| Tetrabromobisphenol A | |
| Tetradecabromodiphenoxybenzene | |
| Tris-dibromopropylisocyanurate | |
| Brominated polystyrene low molecular weight | CAS [88497-56-7] |
| Brominated polystyrene | CAS [88497-56-1] |
| Poly(dibromophenylen oxide) | CAS [26023-27-8] |
| Poly(pentabromobenzylacrylate) | CAS [59447-55-1] |
| poly(dibromostyrene) | CAS [62354-98-7] |
| tetrabromobisphenol A carbonate oligomer, tribromophenoxy end capped | CAS [71342-77-3] |
| dibromoneopentyl glycol | [3296-90-0] |
| pentabromobenylacrylate | [59447-55-1] |
| pentabromobenzyl bromide | [38521-51-6] |
| tetrabromobisphenol A | [79-94-7] |
| tetrabromobisphenol A bis(allyl ether) | |
| tetrabromobisphenol A bis(2-hydroxyethyl ether) | |
| tetrabromophthalic anhydride | [632-79-1] |
| tetrabromophthalic anhydride diol | [7709807-8] |
| tribromophenylmaleininmide | [59789-51-4] |
| 2,4,6-tribromophenol | [118-79-6] |
| Decabromodiphenyloxide | Albemarle, Inc. |
| Tetradecabromodiphenoxy benzene | |
| Ethane-1,2-bis(pentabromophenyl) | |
| Ethylene bis-tetrabromophthalimide | |
| Tris-tribromophenyltriazine | Dead Sea Bromine Group |

TABLE 11

Miscellaneous Uncharged compounds

| Group | Example | Reference or Source |
|---|---|---|
| Metal carbonyl complexes | Manganese decacarbonyl | Pappas pp. 251 |
| | Cyclopentadienyl manganese tricarbonyl | Pappas pp. 251 |
| Nitrosamines | Unsaturated nitrosamines | Pappas pp. 251 |
| Disulfones | Diphenyldisulfone | DS-100[a] |
| | Ditoluidodisulfone | DS-101[a] |

[a]Available from Midori Kagaku Co., Ltd.

In another embodiment, the energy active compound is selected from the group consisting of diazomethane compounds, triazine derivatives substituted at one or more of 2, 4, and/or 6 positions of the triazine ring with $MX_3$ where X is a halogen atom and M is a carbon atom, and any combination thereof. A preferred example is tris[trichloromethyl]s-triazine (TAZ-101, Midori Kogaku).

Photoactive acid generating, compounds are those that exhibit high reactivity and good thermal stability in the ink are preferred. In accordance with an embodiment, the energy active compound comprises a photoabsorbing fragment and a sulfonate, tosylate or triflate group attached thereto, for example, the energy active compound is selected from the group consisting of N-hydroxynaphthalimide triflates, N-hydroxy-5-norbomene-2,3-dicarboximide sulfonates, N-hydroxyphthalimide triflates, naphthalimidyl sulfonates, succinimidyl sulfonates, and benzoin tosylates, and any combination thereof. Examples of such compounds are the succinimidyl sulfonate ester SI-105 (Midori Kogaku), the diazomethane compound DAM-301 (Midori Kogaku), the sulfonated nitride CGI263 (Ciba Specialty chemicals), as well as the tris[trichloromethyl]s-triazine mentioned above.

In accordance with a specific embodiment of the invention, the energy active compound is a thiophenium salt, e.g., an arylcarbonylalkyl thiophenium salt such as S-(2-napthalenecarbonylmethyl)-tetrahydrothiophenium p-toluenesulfonate and S-(2-napthalenecarbonylmethyl)- tetrahydrothiophenium trifluoromethanesulfonate.

One example of a halogenated acid generating photoactive compound is a halogenated hydrocarbon comprising (1) at least two carbon atoms designated carbons 1 and 2 where carbon 1 and carbon 2 are bound together and at least two halogen atoms are directly bound to carbon 1, and carbon 2 is directly bound to another group, for example, an electron withdrawing group, e.g., cyano, hydroxy, fluoride, chloride, bromide, iodide, phosphonate, or sulfonate; or (2) at least three sequentially adjoined carbon atoms designated 1, 2, and 3, wherein at least one halogen atom is bound to carbon 1 and at least one halogen atom is bound to adjacent carbon 2. An example of the first category is 2,2,2-tribromoethanol. An example of the second category is 1,2-dibromocyclohexane.

In accordance with another embodiment, the energy active compound is selected from the group consisting of 1,2,5,6,9,10-hexabromocyclododecane, 2,2,2-tribromoethanol, 1,2-dibromocyclohexane, 2,3-dibromopropionitrile, benzylbromoacetate, bromoacetic acid, bromoacetyl bromide, 2-bromobutyric acid, 2-bromopropionic acid, 2,3-dibromopropane-1-ol, ethyl bromoacetate, and 1,1,2,2-tetrabromoethane, and any combination thereof.

In a further embodiment, the energy active compound is selected from the group consisting of benzophenones, anthraquinones, benzils, benzoin ethers, alpha-hydroxy-alpha,alpha-dialkylacetophenones, and disubstituted aromatic phosphine oxides, and any combination thereof. For example, the disubstituted aromatic phosphine oxides can be bis(2,4,6-trimethylbenzoyl)-phenylphosphineoxide, diphenyl(2,4,6 trimethylbenzoyl)-phosphineoxide, or a combination thereof.

Additionally, energy or photoactive compounds that generate other types of reactive species may also find utility in this invention. For example, photoinitiators may be used to create chemical changes that would result in both the loss of fluorescence or phosphorescence and a color change. In particular, radical photoinitiators absorb light energy and generate a reactive radical species. For example, benzoin ethers are known in the art to undergo homolytic bond cleavage at the carbon-carbon bond between the phenyl ketone and the phenyl ether group resulting in the formation of two radical species. Similarly, alpha-hydroxy-alpha,alpha-dialkylacetophenones undergo homolytic cleavage at the carbon-carbon bond between the phenyl ketone and the hydroxy-substituted alkyl group. The original energy active compound is typically destroyed in the process of reacting with the medium.

Examples of radical photoinitiators include phenones such as benzophenones, acetophenones, and derivatives thereof, all having a phenone group; benzils; benzoins; bezoin ethers; alpha-hydroxy-alpha,alpha-dialkylacetophenones; metal complexes; phosphine oxides; and quinones. The list of suitable radical type photoinitiators include but are not limited to the examples shown in Tables 12 to 13.

TABLE 12

Aceto-and Benzo-Phenones and Their Derivatives

| Example | Source |
| --- | --- |
| 2-methylbenzophenone | Aldrich 15,753-8 |
| 3-methylbenzophenone | Aldrich 19,805-6 |
| Acetophenone | Aldrich A1,070-1 |
| 2-methyl-4'-(methylthio)-2-morpholinopropiophenone | Aldrich 40,563-9 |
| 4-phenoxyacetophenone | Aldrich 29,074-2 |
| 4-ethoxyacetophenone | Aldrich 27,571-9 |
| 3-hydroxyacetophenone | Aldrich 32,810-3 |
| 4-hydroxyacetophenone | Aldrich 27,856-4 |
| 3-hydroxybenzophenone | Aldrich 22,043-4 |
| 4-hydroxybenzophenone | Aldrich H2,020-2 |
| 4,4-bix(dimethylamino)benzophenone | Aldrich 14,783-4 |
| Dibenzosuberenone | Aldrich D3,173-7 |
| 2,2-diethoxyacetophenone | Aldrich 22,710-2 |
| 4,4-dihydroxybenzophenone | Aldrich D11,050-7 |
| 2,2-dimethoxy-2-phenylacetophenone | Aldrich 19,611-8 |
| 3,3,4,4-benzophenonetetracarboxylic dianhydride | Aldrich 26,246-3 |
| 4-benzoylbiphenyl | Aldrich B1,260-1 |
| 2-benzyl-2-(dimethylamino)-4'-morpholinobutyrophenone | Aldrich 40,564-7 |
| 4,4-bis(diethylamino)benzophenone | Aldrich 16,032-6 |
| 4-(dimethylamino)benzophenone | Aldrich 14,934-9 |
| 2,5-dimethylbenzophenone | Aldrich d14,966-7 |
| 3,4-dimethylbenzophenone | Aldrich d14,967-5 |
| Benzophenone | Aldrich B930-0 |

TABLE 13

Miscellaneous Phenones

| Example | Source |
| --- | --- |
| Anthraquinone | Aldrich A9,000-4 |
| Anthraquinone-2-sulfonic acid sodium salt | Aldrich 12,324-2 |
| Thioxanthen-9-one | Aldrich T3,400-2 |
| Ethylanthraquinone | Aldrich E1,220-6 |
| 2-chlorothioxanthen-9-one | Aldrich C7,240-4 |

TABLE 14

Benzil and Benzil Derivatives

| Example | Source |
| --- | --- |
| Benzil | Aldrich B515-1 |
| Methylbenzoylformate | Aldrich M3,050-7 |
| Phenanthrenequinone | Aldrich 15,650-7 |
| 4,4-dimethylbenzil | Aldrich 14,670-6 |

TABLE 15

Benzoins and Benzoin Ethers

| Anisoin | Aldrich A8,840-9 |
| --- | --- |
| Benzoin | Aldrich 39,939-6 |
| Benzoin ethyl ether | Aldrich 17,200-6 |
| Benzoin isobutyl ether | Aldrich 19,578-2 |
| Benzoin methyl ether | Aldrich B870-3 |

TABLE 16

Alpha-hydroxy-alpha,alpha-dialkylacetophenones

| Example | Source |
| --- | --- |
| 1-hydroxycyclohexyl phenyl ketone | Aldrich 40,561-2 |
| 2-hydroxy-2-methylpropiophenone | Aldrich 40,565-5 |

TABLE 17

Miscellaneous

| Category | Subcategory | Source/Examples |
| --- | --- | --- |
| Transition metal complexes | Benzene(tricarbonyl)chromium | 11,931-8 |
|  | Ferrocene | Aldrich F40-8 |
| Quinones | Camphorquinone | Aldrich 12,469-3 |
| Phosphine oxides | Bis(2,4,6-trimethylbenzoyl)-phenylphosphineoxide | Irgacure 819 |
|  | Diphenyl(2,4,6 trimethylbenzoyl)phosphineoxide | Aldrich |

Certain energy or photoactive compounds might benefit in their activity by the presence of other compounds specifically incorporated for that purpose. These compounds include, for example, substituted amine synergists and photosensitizers. An example of suitable substituted amine synergist is (6-dimethylamino)benzylethanoate (DBE, Midori Kogaku) and an example of a suitable photosensitizer is 3,3'-carbonylbis(7-diethylaminocoumarin).

It should be noted that many common compounds over time slowly degrade in the presence of UV light. However, the distinction between these slow degradation processes and rapid reactive species generation should be clear to those skilled in the art. It should not be construed that compounds considered to be light stable that might generate occasional reactive species are indeed the same as reactive photoinitiators.

U.S. Patent Application Publication No. 2003/0112423A1 (Vig et al.) discloses examples of energy active (light sensitive) compounds; the disclosure of which is incorporated by reference.

The luminescent compound or colorant may be selected from dyes and pigment classes. These include but are not limited to any of the following classes: aromatic (e.g., anthracene); substituted aromatic (e.g., nitrobenzene); heterocyclic (e.g., furan, thiophene); cyanine; xanthene (e.g., fluorescein, rhodamine); acridine (e.g., euchrysine); phenazine (e.g., safranine); napthol; pprphyrin; coumarin; pyrromethene; and oxazines; and any combination thereof.

The term "luminescent colorant" is defined as a dye or pigment that responds to irradiation by light of a given energy with the concomitant evolution (or emission) of light of a different energy. These energies may be measured using a typical fluorimeter (Hitach F-4500) designed for this purpose. All practical incident energies are potentially useful including the range of wavelengths from about 100 to 1500 nm. Evolved or emitted energy may be any energy with a wavelength from about 300 to 1000 nm.

The preferred luminescent colorant includes the class of rare earth metal (e.g., lanthanide metal) complexes that luminesce (fluoresce or phosphoresce) in relatively unique fashion. Preferred complexes comprise chelated organic ligands, e.g., rare earth coordination complexes. Without wishing to be bound by theory or mechanism, it is believed that rare earth metal chelate complexes absorb incoming photons primarily via the ligand. The excited state electrons primarily on the ligand are transferred via a non-radiative pathway to the metal center. From here, the electrons relax (in the case of Lanthanides) via what is recognized to be a singlet $^5D_0$ to triplet $^7F_2$ transition emitting (visible) photonic energy in the process. Preferred rare earth metal centers include terbium, dysprosium, europium and samarium. In these metals, the quantum efficiency is high (>0.5) due to the fact that there exist few competitive non-radiative pathways for this transition. Europium based rare earth compounds are more preferred and are commercially available. Commonly owned U.S. Pat. No. 5,837,042 contains many specific examples of rare earth based luminescent compounds and their ligand classes and these are incorporated herein as a reference. Structural examples include those disclosed by American Dye Source, Inc., including the following: Tris(dibenzoylacetonato)-mono(phenanthroline)-europium (III); Tris(dibenzoylmethane)-mono(phenanthroline)-europium (III); Tris(dibenzoylmethane)-mono(5-aminophenanthroline)-europium (III); Tris(dinapthoylmethane)-mono(phenanthroline)-europium (III); Tris(4-bromobenzoylmethane)-mono(phenanthroline)-europium (III); Tris(dibiphenoylmethane)-mono(phenanthroline)-europium (III); Tris(dibenzoylmethane)-mono(4,7-diphenylphenanthroline)-europium (III); Tris(dibenzoylmethane)-mono(4,7-dimethylphenanthroline)-europium (III). Although these compounds each luminesce at 612 nm, the subtle changes in ligand lead to different absorption maxima that range from 330 to 380 nm. The above structures serve to demonstrate similar compounds are often comprised of very subtle differences in the chelated organic ligands. Other suitable general ligand classes include those that contain oxo-, amino-, pyridino-, sulfoxo- ligands such as: beta-diketonates; bypyridines; and macrocyclic bipyridines; crown-ethers; phosphine oxides; sulfonates. Other suitable ligands include the cyclopentadienyl anion.

The luminescence of the rare earth metal complexes, as compared with all organic luminescent dyes, is characterized by high intensity, narrow energy distribution in terms of emitted energy, and a large energy gap (Stokes shift) between the absorption energy and the emission energy. Most of these compounds absorb energy in the ultraviolet light region and emit energy in the visible region. The exact color or wavelength of the emitted energy depends on the identity of the rare earth metal. For example, luminescence color for chelate complexes based on terbium, dysprosium, europium and samarium are yellow-orange, orange, orange-red, and red, respectively.

Background scientific information can be obtained on certain fluorescent materials from Parra et al., Enhancement of the Luminescent Intensity of the Novel System Containing $Eu^{3+}$-β-Diketonate Complex Dopes in the Epoxy Resin. *J. Appl. Polym. Sci.*, 83, 2716–2726 (2002); Voloshin et al., Water enhances quantum yield and lifetime of luminescence of europium (III) tri-β-diketonates in concentrated toluene and acetonitrile solutions. *J Luminescence*, 93, 191–197 (2001).

In accordance with embodiments of the invention, the luminescent colorant is an UV, visible, or IR luminescent colorant; which has light emission ranges of 200 to 400 nm, 400 to 700 nm, and 700 to 1300 nm, respectively.

Dyes may also differ in the absorption and emission characteristics based on their chemical structure. The present invention is relevant to all structural classes of said dyes and pigments. Examples of preferred luminescent colorants are the rare-earth complex pigments or dyes such as LUMILUX CD331 and LUMILUX CD332 (from Honeywell) which are europium organoligand complexes, e.g., or europium metal chelate complexes or europium organoligand coordination complexes.

A non-luminescent or secondary colorant (e.g., dye) may be incorporated into the ink composition to provide a visible color to the mark or to alter the luminescence properties of the primary luminescent compound (e.g., dye). Preferred secondary colorants are those that exhibit a color change when the pH of their environment is altered. Even more preferable are those that exhibit negligible absorbance in the near UV (300 to 400 nm wavelength), so as not to interfere with the absorbance of the energy active or photoactive compounds, and that exhibit a high degree of light fastness, e.g., to sunlight. Examples of preferred secondary colorants that exhibit color change under acidic conditions are Basic Violet 4 (triarylmethane dye class, Color Index 42600), Solvent Red 49 (xanthene dye class, Color Index 45170:1), and Solvent Orange 3 (azo dye class, Color Index 11270:1). Other examples of secondary colorants that may be appropriate for the present invention include colorants from the dye classes listed above as well as colorants from dye classes such as anthraquinones, diphenylmethanes, thiazines, oxazines, azines, pyronines, thiopyronines, acridines, polymethine, indigoid, nitro, and nitroso, and combinations thereof. The non-luminescent colorant can be titanium dioxide, a triarylmethane dye, or a xanthene dye.

In another embodiment, the luminescent compound (e.g., luminescent dye) and the colorant (e.g., dye) might be one and the same. In this embodiment, reaction of the mark with energy brings about a change in luminescence activity along with a concurrent change in body color. The change in luminescence activity and/or color may occur independently of one another. Preferred examples of luminescent compounds that are also colored dyes include C.I. Solvent Red 49 available as Sepisol Fast Red MG (BIMA Corporation); fluorescent metal complex azo dyes such as aluminum: acid Alizarin Garnet R; and fluorescent azo dyes such as 4-dimethylamino-N-benzylidine-4'-nitroaniline.

In accordance with an embodiment of the invention, colorants, e.g., dyes or pigments, may be included to provide a visible color when an invisible luminescent compound is used. This colorant may also serve to enhance the color (strength) of the mark prior to or subsequent to the energy-induced color change described above. Mixtures of colorants may be used to bring about the desired color change where at least one of the colorants is unreactive in the system. For example, a white and red color could be used where the red colorant when exposed to light becomes colorless. The resulting mark would retain the color of the white colorant and the resulting color change would be from red to white. Preferred such colorants include ones that do not absorb light energy near the light emission or excitation wavelengths of the luminescent compound.

Most commercial colorants are sufficiently heat and light stable to survive indoor ambient lighting conditions for short periods of time. These colorants (dyes) might decompose readily by either applied heat or light but the energy required would be high from cost or safety standpoint. An advantage of the present invention is to lower the energy requirements needed to change the colorant in some fashion in order to provide a visual or machine detectable change. This can also be brought about by a change in color, color intensity, luminescence energy or intensity. Dyes that are relatively stable toward directly applied heat or light can chemically react with other components that can efficiently absorb light or heat energy. After application of light or heat, these photoactive compounds are prone to generate highly reactive species, either free acid or free electrons (radicals) that are highly likely to react with other components in the medium. The ink compositions of the invention, as marks, undergo efficient and detectable changes via reaction of the luminescent or colored dyes with these photoactive components.

For the luminescent colorless compound, the reaction with the active species may alter an absorption or emission characteristic of the luminescent colorless compound. The absorption characteristic is a wavelength of absorption, e.g., a wavelength of maximum intensity or a wavelength of average intensity. The reaction may alter the emission characteristic, e.g., a wavelength of emission, intensity of emission, or lifetime of emission. The wavelength of emission can be the wavelength of maximum intensity or average intensity. The reaction may increase or decrease the intensity of emission or increase or decrease the lifetime of emission.

The ink composition of the present invention includes a suitable solvent, for example, an organic solvent or a mixture of one or more organic solvents. Preferably, the organic solvent is a volatile organic solvent. Volatile organic solvents are defined as those that exhibit an evaporation rate of at least a factor of 0.2 times that of n-butyl acetate (whose evaporation rate is 1.0).

The volatile organic solvent is generally selected from the group consisting of alcohols, ketones, cyclic ketones, esters, ethers, and any combination thereof. For example, the organic solvent is selected from the group consisting of methanol, ethanol, n-propanol, isopropanol, butanol, acetone, methyl ethyl ketone, ethyl acetate, n-propyl acetate, isopropyl acetate, cyclohexanone, and any combination thereof. Preferred primary solvents include those that exhibit a high degree of volatility so that dry marks can be obtained from the liquid state within a relatively short time, e.g., less than 1 minute, preferably less than about 10 seconds, more preferably less than about 2 seconds of application of a wet mark. These solvents include but are not limited to, methanol, ethanol, iso/n-propanol, n-butanol, acetone, methyl ethyl ketone, ethyl acetate, iso/n-propyl acetate, cyclohexanone, or mixtures thereof. Solvents with lower volatility may be used in certain embodiments of the invention, e.g., if the applied mark is placed on a porous substrate. After application of such inks, the mark will dry as the solvent is drawn into the pores of the substrate.

The ink composition of the present invention can include one or more additional ingredients, e.g., preferably one or more binder resins. In an embodiment, the binder resin is a thermoplastic resin. In accordance with an embodiment of the invention, the binder resin is selected from the group consisting of amides, urethanes, esters, epoxy resins, ketone resins, vinylpyrrolidone copolymers, vinyl polymers, vinylbutyral copolymers, acrylics, styrene/acrylics copolymers, cellulosics, nitrocellulose, phenolic resins, hydroxystyrene polymers, vinyl alcohol polymers, styrene/allyl alcohol copolymers, and any combination thereof.

The choice of the binder resin would be based on the one that imparts the best functional performance for the mark. However, certain resins might either serve to enhance reactivity of the mark toward light by not interfering with incident light; or to stabilize the mark toward light by absorbing incident light. Examples of preferred resins that are relatively transparent to UV light are cellulose esters, e.g., cellulose acetate, cellulose acetate butyrate, and cellulose acetate propionate (a variety of which are available from Eastman Chemical Inc.). Examples of preferred resins that absorb light and would reduce the reactivity of the mark toward light are those that are comprised of some degree of structural (hydrocarbon) unsaturation. These include the styrenic resins (styrene acrylics, styrene allyl alcohols, and polyhydroxystyrene); phenolics; phenoxies; aromatic polyketones; aromatic polyurethanes; and aromatic polyamides.

The ink composition of the present invention may further include one or more additives selected from the group consisting of humectants, plasticizers, light blockers, surfactants, wetting agents, heat stabilizers, biocides, adhesion promoters, and conductivity agents.

The inks described in this invention can be applied by any suitable method, preferably via ink jet printing. Ink jet printing is a well-known technique by which printing is accomplished without contact between the printing device and the substrate on which the printed characters are deposited. Briefly described, ink jet printing involves the technique of projecting a stream of ink droplets to a surface and controlling the placement of the droplets to form the desired printed image on that surface. This technique of noncontact printing is particularly well suited for application of characters onto substrates such as glass, metal, or plastic containers.

Ink jet printing can be employed to print covert markings. Reviews of various aspects of ink jet printing can be found in these publications: Kuhn et al., *Scientific American*, April, 1979, 162–178; and Keeling, *Phys. Technol.*, 12(5), 196–303 (1981). Various ink jet apparatuses are described in the following U.S. Pat. Nos. 3,060,429, 3,298,030, 3,373,437, 3,416,153, and 3,673,601.

In general, an ink jet composition must meet certain requirements to be useful in ink jet printing operations. These relate to viscosity, resistivity, solubility, compatibility of components and wettability of the substrate. Further, the ink must be quick-drying and smear resistant, resist abrasion, and be capable of passing through the ink jet nozzle without clogging, and permit rapid cleanup of the machine components with minimum effort. The formulator skilled in the art can achieve the desired liquid physical properties for use in the ink jet process e.g. viscosity, surface tension, and solution stability.

In an embodiment, the ink composition of the present invention has a viscosity of from about 1.6 centipoises (cps) to about 7 cps at 25° C., an electrical resistivity of from about 50 ohm-cm to about 2,000 ohm-cm, and a sonic velocity of from about 1100 meters/second to about 1700 meters/second.

The invention also allows for formulation components that would be suitable for the continuous ink jet printing (CIJ) process. Inks for CIJ are required to exhibit a solution conductivity on the order of 1000 microSiemens or greater. An added salt soluble in the ink carrier is usually employed to achieve this requirement. The salt is typically added in an amount of from about 0.5 to 3 percent by weight of the ink composition. In some embodiments, advantageously, the energy active compound may provide the desired conductivity and hence the use of a conductivity enhancing salt is not necessary.

In accordance with an embodiment of the present invention, the ink composition can be printed on a drop-on-demand (DOD) ink jet printer. Such ink composition has a viscosity from about 3 cps to about 30 cps at the operating temperature of the print engine (usually 25–70° C.), e.g., from about 4 cps to about 120 cps at 25° C., electrical resistivity greater than about 3 Kohms-cm, and a surface tension from about 25 to 38 dynes/cm at 25° C. Inks in this embodiment must also pass rigorous long-term stability tests that ensure that no sedimentation of the ink components occur over the life of the ink. Inks in this embodiment will also generally have boiling points greater than 200° C.

Plasticizers may be used such as those belonging to the chemical classes of disubstituted phthalates, alkoxy-phosphates, acyclic polyesters, epoxidized oils, dibasic esters, and trimellitates. Other modifying components such as light stabilizing compounds (more commonly known as UV blockers), heat stabilizers, wetting agents, biocides and adhesion promoters may also be added to the ink composition to achieve the desired functional properties. Incorporation of from about 1 to about 15% by weight of a white pigment dispersion (e.g., MICROLITH™ R-K dispersion of titanium dioxide in vinylacetate/vinyl chloride copolymer) may enhance the readability of the mark on a variety of substrates, especially translucent ones. From about 0.01 to about 2% of wetting agent (e.g., Unidyne NS-1603 from Daikin Industries) may be incorporated to improve the dot size on the substrate and to adjust image intensity. In addition, from about 0.01 to about 5% by weight of adhesion promoters (e.g., trialkoxysilanes) may be employed to improve adhesion on certain substrates.

Other components may be incorporated to improve printer operability, for example, from about 0.5 to about 10% of a humectant prevents premature drying of the ink in the printer. Examples of humectants include but are not limited to glycol ethers, esterified lactates, N-methyl pyrrolidone, amyl acetate, propylene carbonate, or dimethyl sulfoxide. From about 0.1 to about 2.0% of a defoamer (e.g., Tego Foamex N from Tego Chemie Service) that is compatible with the ink vehicle (solvent) may be employed to reduce foam build up in a CIJ printer.

Further, the use of light stabilizing compounds may be highly beneficial in that they serve to prevent the energy active compound from undesirably reacting with light of a given wavelength. For example, a system might be designed that is appreciably unreactive toward ambient light while reactive toward higher energy UV light. In such a system, a light stabilizing compound may be employed that has a preeminent absorption in the energy region that is similar to the energy of normal ambient light between 300 and 400 nm (i.e., sunlight contains UV light down to about 300 nm). In addition, an energy active compound having a complementary preeminent absorption between 250 and 300 nm may be employed. The presence of the light stabilizing compound would serve to consume the incident ambient light energy; but an energetic window would remain where a light with the correct energy (e.g., 300 nm or lower) could be delivered to the energy active compound by an appropriate light source.

Light stabilizing compounds are structurally comprised of light absorbing sub-structures—particularly aromatic functional groups—that are also commonly found in energy active compounds. By definition, effective light stabilizing compounds, however, do not generate species that are reactive toward the surrounding medium, as do the energy active compounds described above. Instead, these species usually absorb light energy and convert that energy to heat without a concomitant structural degradation. For example, one of the most commonly used light stabilizing compounds used in protective sunscreens, octyl para-methoxy cinnamate, undergoes a photoisomerization when exposed to light and then gradually converts back to the more stable isomer when the light source is removed. Examples of suitable light stabilizing compounds are as follows.

TABLE 18

Light Stabilizing Compounds

| Category | Subcategory | Examples |
|---|---|---|
| Acrylic acid, 2-cyanoethyl esters | | Uvinul 3039, 3035; UVSOB 320 |
| Benzophenones | Hydroxy substituted | Uvinul P25, 400, D-49, D-50; UBSOB 340; Syntase 1200; Maxgard 200; Mark 1535; Cyasorb UV2098, UV2126, UV24, 284; Cyagard 531, UV9 |
| Propanediones | Aromatic propanedione | Givsorb UV-14 |
| Triazines | | Uvinul T-150; Tinuvin 1545, 1577, 400; Cyagard 1164 |
| Benzotriazoles | Hydroxyphenyl | Tinuvin 840, 900, 928, 326, 327, 328, 384, 571, 109, 1130, 320, 99, P; THPE BZT; Norblock 6000, 7966; Cyagard UV544 |
| Oxamides | Formamidines | Sanduvor 3206, EPO; Givsorb UV-1, UV-2 |
| Benzoates | Hydroxyphenyl benzoates | Eastman RMB; Escalol 507 |
| | Phenyl salicylates | Escalol 587 |
| | Hindered benzoates | Tinuvin 120; Cyasorb UV2908 |
| Benzilidenes | Cinnamates | Escalol 557; UVSOB A, 360 |
| | phenyl propanoates | Givsorb UV-15 |
| | benzilidene malonate esters | Cyasorb UV1988 |
| Hindered phenols | | Mark 446 |
| Phenyl propanoates | | Givsorb UV-13 |
| Benzimidazoles | | Givsorb UV-16; UVSOB HS |
| Benzoxazinones | | Cyagard 3638 |
| Miscellaneous | Avobenzones Quercitins | |
| Metal complexes | | Cyasorb 1084 |

Radical scavengers can also serve as light stabilizing compounds. Examples of such scavengers include hindered amine light stabilizers (HALS). Specific examples of HALS are Uvinul 4049 H, Unvinul 4050 H, and Uvinul 5050 H from BASF Chemical Inc.

Any suitable substrate can be marked in accordance with the present invention, for example, metal, glass, and plastics, particularly polished steel cans, aluminum cans, PET slides, glass bottles, and the like.

In an embodiment, the present invention provides an ink composition which contains the solvent in an amount of from about 30 to about 95% by weight, preferably from about 40 to about 75%, and more preferably from about 50 to about 65% by weight, the binder resin in an amount of from 0 to about 30% by weight, preferably from about 1 to about 25, and more preferably from about 5 to about 20% by weight, the luminescent compound or colorant in an amount of from about 0.01 to about 10% by weight, preferably from about 0.1 to about 5% and more preferably from about 0.1 to about 3%, by weight, a non-luminescent colorant in an amount of from 0 to about 10% by weight, preferably from 0.01 to about 5%, and more preferably from about 0.1 to about 2%, by weight, and the energy active compound in an amount of from about 0.1% to about 15% by weight preferably from about 0.1 to about 10%, and more preferably from about 0.1 to about 5%, by weight. The solvent is preferably an organic solvent, e.g., an organic polar solvent, such as acetone. The binder resin is preferably a polyketone resin (e.g., Synthetic Resin SK from Degussa Huls Inc.). The luminescent compound is a phosphorescent dye comprising europium. The non-luminescent colorant is preferably an azo dye, e.g., Chrysolidine Y base. Preferably, the ink composition also contains a conductivity agent, e.g., tetrapropylammonium bromide, in an amount of from about 0.5 to about 5%, preferably from about 0.5 to about 3, and more preferably from about 0.8 to about 2%, by weight of the ink composition. The energy active compound is preferably one that is UVC reactive and soluble in the solvent. An example of energy active compound is tribromoethanol.

In another embodiment, the energy active compound and the conductive salt could be one and the same. For example, from about 0.5 to about 15% of an onium salt, preferably from about 1 to about 10%, and more preferably from about 1 to about 3%, by weight, (e.g., mixed triarylsulfonium salts, specifically UVI-6976, from Dow Chemical) miscible with the ink vehicle (solvent) may be used to replace both the conductive salt and the energy active compound.

In another alternative embodiment of the formulation described above, the luminescent compound the colored component could be one and the same. For example, both the luminescent compound and the colored dye are a colored xanthene-based dye (e.g., Solvent Red 49, Neptune Base Red from BASF) that is reactive toward the energy active compound. Reaction with a shortwave light source, e.g., UVC, brings about the complete change in color of the dye from red to colorless and near complete loss in fluorescence. This particular combination provides for a system that is rendered unreadable to both a machine and the human eye simultaneously. The disappearance of the color of the mark provides absolute feedback to a human observer that the mark has been rendered useless. In addition, this embodiment is advantageous because an ink with a single component is relatively inexpensive to manufacture.

In an embodiment, the present invention provides an ink composition suitable for ink jet printing comprising a non-luminescent colorant, a solvent, and an energy active compound. When a mark made from the ink composition is exposed to an effective amount of energy, the non-luminescent colorant undergoes a change, e.g., in absorption wavelength. Any of the non-luminescent colorants discussed above can be used. An example of such colorant is Solvent Orange 3. Any suitable energy active compound can be used, e.g., tribromoethanol.

In yet another embodiment of the current invention, the ink jet ink could be formulated to react only with light of a desired wavelength. Marks created from said ink would visibly change color and be reduced in luminescence, as was the case in the examples above when irradiated with light. However, the ink composition would be more resistant to reaction with ambient lighting than the previous formulation. Such an ink composition comprises of the following: 1) from about 30 to about 95% of a polar organic solvent (e.g., acetone) preferably from about 40 to about 75%, and more preferably from about 50 to about 65%, by weight; 2) from about 1 to about 30% of a resin soluble in the ink vehicle (e.g., polyvinylpyrrolidone/vinylacetate copolymer E-335 from ISP Incorporated); 3) from about 0.01 to about 10% of a europium based phosphorescent dye soluble in the ink vehicle, preferably from about 0.1 to about 5%, and more preferably from about 0.1 to about 3%, by weight, (e.g., SMARTdye™ UR-3 from Photosecure); 4) from 0 to about 10% of an azo-type colored dye, preferably from about 0.01 to about 5%, and more preferably from about 0.1 to about 2%, by weight, (e.g., Solvent Yellow 56) exhibiting a yellow color that undergoes a color change from yellow to red-brown upon protonation by a strong acid; 5) from about 0.1 to about 15% of an energy active compound that is reactive toward UVC radiation and soluble in the ink vehicle, preferably from about 0.01 to about 10%, and more preferably from about 0.1 to about 5%, by weight, (e.g., tribromoethanol or hexabromocyclododecane); 6) about 0.5 to about 5% of a conductive salt preferably from about 0.5 to about 3%, and more preferably from about 0.8 to about 2%, by weight, (i.e., tetrabutylammonium hexafluorophosphate) soluble in the ink vehicle and exhibiting good conductivity therein; 7) 0 to about 15% of a UV light stabilizing compound, preferably from about 0.1 to about 10%, and more preferably from about 0.5 to about 6%, by weight (e.g., octylmethoxycinnamate, Escalol 557 from ISP Incorporated); 8) 0 to 15% of a white pigment dispersion, preferably from about 5 to about 15%, and more preferably from about 5 to about 10%, by weight, (e.g., Microlith R-K from Ciba that is a dispersion of titanium dioxide in vinylacetate/vinylchloride copolymer) to enhance the readability of the mark on variety of substrates; and 9) 0 to about 25% of a humectant, preferably from about 0.5 to about 20%, and more preferably from about 0.5 to about 10%, by weight, (e.g., primary amyl acetate) may prevent premature drying of the ink in the printer.

The marks produced by embodiments of the ink compositions of the present invention, e.g., CIJ inks, have very short dry times, typically less than 2 seconds at room temperature and have good adhesion to a variety of non-porous surfaces. In addition, in embodiments, they are removable with water. However, water insoluble marks could be formed in a similar manner by changing the resin from a vinylpyrrolidone/vinylacetate to a different resin such as an acrylic. The marks in the above embodiment will change color when irradiated by a UVC source from yellow to a red-brown color. In addition to the darkening of the sample, the luminescence intensity when irradiated within the known excitation frequency of the dye (excitation maxima for europium dyes usually lie between 350 and 400 nm) will be greatly decreased.

Another embodiment of the current invention wherein the ink jet ink reacts only with light of a desired wavelength, is as follows: 1) from about 40 to about 98% of a organic solvent, preferably from about 60 to about 95%, and more preferably from about 70 to about 95%, by weight, (e.g., tripropyleneglycol-monomethylether); 2) from 0 to about 40% of an organic solvent for viscosity modification, preferably from about 3 to about 15%, and more preferably from about 5 to 10%, by weight (e.g., triethyleneglycol); 3) from about 0.01 to about 10% of an europium based phosphorescent dye soluble in the ink vehicle, preferably from about 0.1 to about 5%, and more preferably from about 0.1 to about 3%, by weight (e.g., LUMILUX CD-331 dye); 4) from 0 to about 10% of a azo-type colored dye, preferably from about 0.01 to about 5%, and more preferably from about 0.1 to about 2%, by weight (e.g., chrysolidine Y base exhibiting a yellow color that readily undergoes a color change from yellow to brown upon protonation by a strong acid); 5) from about 0.1 to about 15% of an energy active compound that is reactive toward UVC radiation and soluble in the ink vehicle, preferably from about 0.1 to about 10%, and more preferably from about 0.1 to about 5%, by weight, (e.g., tribromoethanol). The ink has the required physical properties for operation in a DOD printer: e.g., viscosity from about 3 cps to about 30 cps at the operating temperature of the print engine (usually between 25 and 70° C.; e.g. from about 4 to about 120 cPs at 25° C., an electrical resistivity greater than about 3 Kohms-cm, and a surface tension from about 25 to 38 dynes/cm at 25° C. The formulation generally exhibits a boiling point greater than 200° C.

Liquid viscosity modifiers may include any liquids with a viscosity greater than 6 cps. More preferably, the thickeners will include any liquids with a viscosity greater than 20 cps. Even more preferably the liquid thickeners will exclude molecules comprised of reactive functional groups consisting of epoxides or unsaturated carbon groups (e.g., acrylates and vinyls).

Printed images produced would be intended for porous substrates such as paper since the formulation above does not contain a binder resin. However, it is possible to include a binder resin in a DOD ink formulation and that possibility is not excluded here. As described above, images when irradiated with light energy between about 350 and 380 would exhibit red luminescence with a large Stokes shift in a relatively narrow region from about 600 to 630 nm. The marks when irradiated with ultraviolet light particularly with wavelengths below about 300 nm would visibly change from yellow to orange/brown in color. In addition, the luminescence intensity of the marks when irradiated by light between about 350 and 380 nm would be reduced.

The degree of color change and fluorescence loss as described here would depend on a number of formulation parameters including the amount of energy active compound and the ratio of the energy active compound to the reactive colorant and luminescent compound. Other parameters would include the nature of the substrate and the actual energy and power output of the cancellation light source. For example, when using a low power handheld germicidal 254 nm source such as is available from Spectroline Incorporated, complete reaction is observed within minutes at energy active compound to (combined dye plus luminescent compound) weight ratios of about three or more. Complete reaction is defined here as total visible conversion of all yellow form of the Chrysolidine Y base dye to the brown form and nearly complete fluorescence reduction to under five percent of the initial value. Using a higher power source, like a high-pressure mercury vapor arc lamp available from companies like Fusion Systems Incorporated, much faster rates for complete reaction can be achieved. The same degree of reaction for such a system can be on the order of a second or less which would allow for the use of the marks in high speed processes such as the sorting of manufactured goods on assembly lines. An added advantage with this combination of components is that relatively good stability toward ambient, indoor lighting is achieved. Freshly printed samples may be stored for hours or days under these conditions with little change to the color or luminescence intensity.

It is important to note that in the above example that both the colorant (i.e., Chrysolidine Y base) and the luminescent compound (i.e., LUMILUX CD-331 dye) will simultaneously react with the energy active compound (i.e., tribromoethanol). In fact, both changes serve to diminish the overall luminescence intensity of the luminescent compound. In the case of the luminescent compound, the luminescence is quenched directly. In addition, the change in color of the colorant from yellow to brown corresponds to an increase in the average energy of light absorbed. In the initial state, the yellow dye absorbs primarily in the region from 400–500 nm and is practically transparent in the emission region of the luminescent compound. In the final state, the colorant absorbs light strongly in the same energy region (about 610 nm) that luminescence occurs and thus contributes to the reduction in overall observable luminescence intensity.

The term "machine-readable" has been used herein to generalize how the changes in the mark due to reaction with energy can be detected. There are electronic measurement techniques designed to assess either a change in luminescence or color that may be appropriate for use here. The changes may be detected by any suitable method, for example, by the use of photodiodes, cameras, CCD sensors, CMOS sensors, spectrometers, and calorimeters.

The present invention further provides a process for authenticating a substrate comprising: (a) providing an authenticating mark on the substrate using the ink composition of the invention; (b) reading the authenticating mark; (c) exposing the authenticating mark to an effective amount of deactivating energy to generate species that react with the luminescent compound or colorant and/or non-luminescent colorant(s) to obtain an energy-exposed authenticating mark; and (d) reading the energy-exposed authenticating mark. Reading the authentication mark might be used to determine the change in luminescence intensity or wavelength when comparing the mark prior to and subsequent to exposure to the deactivation source. Thus, such a reader would be comprised of a system for acquiring luminescence information. Another means to determine the effect of exposing the authentication mark would be to measure the difference in contrast of the mark prior to and subsequent to exposure to the deactivation source. Information gleaned from reading the authenticating mark might be comprised of acquiring a luminescence or light-contrast based image to determine the information contained in the printed mark in the form of alphanumeric symbols, 1-D barcodes, 2-D barcodes, datamatrix codes, etc. In addition to the information contained in the printed mark the ratios of the luminescence intensity or contrast prior to and subsequent to exposure to the deactivation source could be determined. These ratios could be used in an automated algorithm to determine if the mark had or had not been exposed or deactivated. Other methods for determining the pre-and post-exposed condition of the mark for use in such algorithms are possible and are not excluded from the scope of this invention. Reading could comprise measuring the contrast as a result of change in luminescent compound or non-luminescent colorant. The change could be a change in the spectrum, e.g., absorption wavelength, absorption intensity, emission wavelength, emission intensity, or emission lifetime.

The present invention further provides a system for authenticating a substrate comprising: (a) the ink composition of the invention; (b) an ink jet printer; (c) a substrate; (d) a deactivation energy source; and (e) a reading device. The reading device for the system described above might be comprised of an electronic detection device for the mark, an excitation light source, and possibly secondary reading devices for validating the mark indirectly. Excitation sources are most likely to be xenon flash lamps or other sources that emits at a wavelength that corresponds to the excitation energy region of the luminescent compound. Xenon flash lamps are particularly preferred because they have very high radiant power output over a broad band of potential excitation wavelengths and consume relatively little energy. In addition, these lamps emit very high power without exposing the substrate to damaging heat. Secondary reading devices might be included with the primary reading device to validate the authenticity of the authentication mark. For example, in the case of beverage packages, a conventional bar code reader could read a UPC barcode on the package and confirm that it is marked with the proper authentication mark. Additionally, IR sensors may determine the shape profile of the package and determine its nature to compare with the information gained from the authentication mark. This information may be used also to determine how the mark will be treated by the system with respect to deactivation requirements and reading requirements.

The present invention also provides advantages for process control in production or distribution environments. Luminescent colorants (e.g., dyes) respond with emitted visible or invisible light of a given wavelength when irradiated with light energy of another wavelength. The dyes can be chosen to emit light at a desirable intensity and energy to be machine-readable. The emitted light may be chosen to work well with photosensitive devices. These systems can overcome problems associated with common automated code-reading processes such as stray, interfering ambient lighting or color interference from the substrate background. The ease of machine readability lends to the use of luminescent colorants in automated processes. For example, articles may be sorted by reading their identifying markings at very high throughput speeds for use in centralized distribution facilities. In production processes, the present invention makes it possible to distinguish articles that have undergone one process from articles that have undergone another process.

Another example of process control where the present invention is useful is in process monitoring. The present invention advantageously provides machine-readable inks that indicate the progress of processes without the need for a line operator. A visual indication is not a requirement in the present invention. Hence, the present invention lends to the usefulness of luminescent markings in automated processes.

The present invention advantageously provides a single ink composition that could be used for these multiple purposes—e.g., color change and luminescence change—to have both the colored component and the luminescent colorant together in a single system. In a preferred embodiment, each of the colorants is reactive with a single other component in the system so that the desired chemical changes in the two colorants occur simultaneously. This allows for the application of the mark on production lines using a single applicator, such as an ink jet ink printer. The use of a single fluid with a single applicator is highly desired in the design of a security system so that any breech in the integrity of the system—i.e., fluids that are stolen for use elsewhere—can be quickly identified.

The changes in the color of a visibly colored component, as a result of exposure to energy, could affect the intensity and/or the emission color of the luminescence signal. The resulting effects on intensity provide an advantageous means for discrimination of the status of a marked article. For example, a shift in color from yellow to red of a visibly colored component might lead to a reduction in the emission intensity of a luminescent component that luminesces in the red region. A second induced change in color might lead to a transition of the visible component from red to colorless, reviving the initial luminescence. These changes would be machine-readable and thus lend to the usefulness of the present invention in an automated process.

The reactive systems of the present invention are advantageous in that they are compatible with more efficient energy sources that might also serve to activate the system at lower substrate temperatures. The photochromic markings in accordance with an embodiment of the invention undergo irreversible changes.

The present invention further provides, in an embodiment, an ink composition comprising a luminescent compound, a non-luminescent colorant and an energy active compound, wherein the reactive species react (in the mark) to alter the absorption or emission characteristic of a non-luminescent colorant such that the altered absorption of the non-luminescent colorant overlaps or coincides with the absorption or emission characteristic of the luminescent compound, for example, as illustrated in FIG. 2.

The present invention provides advantages such as good adhesion of the mark to substrates, and in embodiments, the ink is free or substantially free of solvents such as methyl ketone (MEK) or methanol. Embodiments of the marks also resist condensation.

The following examples further illustrate the invention but, of course, should not be construed as in any way limiting its scope.

EXAMPLE 1

This Example illustrates the use of cationic photoinitiators as energy active compounds and the change in luminescence upon irradiation with UV energy. A resin solution, designated Solution 1, was made by dissolving 100.0 g of the styrene acrylic copolymer JONCRYL ™611 (Johnson Polymers) in 400.0 g of acetone. Dye solutions were by dissolving approximately 1% of the luminescent europium organocomplex dye LUMILUX CD-331 in Solution 1. To each of these solutions, a different energy active compounds was added. These solutions are summarized in Table 19.

TABLE 19

| Solution Number | Solution 1 (% weight) | LUMILUX CD-331 (% weight) | Additive Name and Amount (% weight) |
|---|---|---|---|
| 2 | 99 | 1 | None |
| 3 | 94 | 1 | 5% Mixed triarylsulfonium salt (UVI-6976)[a] |
| 4 | 94 | 1 | 5% Diaryliodonium salt (CGI-552)[b] |

TABLE 19-continued

| Solution Number | Solution 1 (% weight) | LUMILUX CD-331 (% weight) | Additive Name and Amount (% weight) |
|---|---|---|---|
| 5 | 94 | 1 | 5% Tetrabutylphosphonium bromide (TBPBr)[c] |
| 6 | 89* | 1 | 5% Tetraphenylphosphonium bromide (TPPBr)[*,c] |
| 7 | 94 | 1 | 5% Benzophenone (BP)[c] |
| 8 | 94 | 1 | 5% Darocur 1173 (1173)[b] |
| 9 | 94 | 1 | 5% Darocur TPO (TPO)[b] |
| 10 | 94 | 1 | Lauric acid[c] |

*5% ethanol replaced 5% of the Solution 1 to solubilize TPPBr.
[a]UVI-6976 from Dow Chemical
[b]CGI-552 from Ciba
[c]Aldrich, Inc.

Solid draw down samples of each of the solutions in Table 19 were made by drawing down the ink using a #8 steel draw down bar on aluminum plates. The aluminum plates were cut into small strips. The strips were exposed to a handheld ultraviolet lamp Model ENF-260c (Spectroline Inc.) that possessed separate lamps (light bulbs) for UVA and UVC irradiation. These lamps emit narrow band radiation at about 365 nm and 254 nm, respectively, at the corresponding lamp setting. The samples were exposed for two minutes by placing them directly beneath the lamp but not in direct contact with the lamp's surface. After exposure, the samples did not feel even warm to the touch.

The remaining luminescence intensity of each of the samples was assessed by measurement using a Hitachi F-4500 fluorimeter. The peak area of emission was identified by performing a three dimensional array of excitation frequency versus emission frequency and then choosing an excitation maximum. Using this excitation frequency a plot of emission frequency was made that showed the frequency region that with highest visible luminescence intensity. Quantitative values for each sample were determined by integrating the region beneath the curve representing the measured emission at each frequency within the region with highest intensity.

For LUMILUX CD-331, the excitation wavelength was chosen to be 358 nanometers (nm). Emission data were obtained by integrating the area from 600 to 630 nm. The emission intensity post UV exposure was divided by the emission intensity prior to exposure to obtain a percentage remaining luminescence. The percentages of remaining lumineseence after UV light exposure are given in Table 20 for each of the solutions listed in table 19.

TABLE 20

| | | Percent remaining luminescence after 2 minutes exposure to UV lamp | |
|---|---|---|---|
| Solution | Additive | Shortwave (254 nm) | Longwave (365 nm) |
| 2 | None | 86 | 92 |
| 3 | UVI-6976 | 4 | 4 |
| 4 | CGI-552 | 1 | 58 |
| 5 | TBPBr | 76 | 66 |
| 6 | TPPBr | 79 | 83 |
| 7 | BP | 91 | 63 |
| 8 | 1173 | 57 | 67 |
| 9 | TPO | 66 | 80 |
| 10 | Lauric acid | 97 | 94 |

TABLE 20-continued

| | | Percent remaining luminescence after 2 minutes exposure to UV lamp | |
|---|---|---|---|
| Solution | Additive | Shortwave (254 nm) | Longwave (365 nm) |
| Average % reduction for acid generators | | 98 | 69 |
| Average % reduction for radical generators | | 29 | 30 |
| Average % reduction for bromide salts | | 23 | 31 |

As can be seen by the results in Table 20, the ionic acid type photoinitiators provide a strong advantage in luminescence reduction over either bromide salts are radical type photoinitiators. The later two groups are better, however, than no representatives without any added salt of photoactive compound.

EXAMPLE 2

This Example illustrates the use of halogenated photoacid generators as energy active compounds and the change in luminescence upon irradiation with UV energy. Several more representative solutions were prepared as in Example 1. Dye solutions were made by dissolving approximately 1% of the luminescent europium organocomplex dye LUMILUX CD-331 (Honeywell Corp.) Solution 1. To each of these solutions, a different energy active compound was added. These solutions are summarized in Table 21.

TABLE 21

| Solution Number | Solution 1 (% weight) | LUMILUX CD-331 (% weight) | Additive Name and Amount (% weight) |
|---|---|---|---|
| 11 | 94 | 1 | 5% 1,2-dibromocyclohexane (DBCH)[a] |
| 12 | 94 | 1 | 5% 1,10-dibromodecane (DBD)[a] |
| 13 | 94 | 1 | 5% tribromoethanol (TBE)[a] |
| 14 | 94 | 1 | 5% tribromoneopentyl alcohol (TBPA)[a] |
| 15 | 94 | 1 | Perfluoroheptane[a] |

[a]Aldrich, Inc.

The solutions in Table 21 were subject to the same light exposure and analyses conditions as demonstrated in Example 1. The results are given in Table 22.

TABLE 22

| | | Percent remaining luminescence after 2 minutes exposure to UV lamp | |
|---|---|---|---|
| Solution | Additive | Shortwave (254 nm) | Longwave (365 nm) |
| 2 (from Example 1) | None | 86 | 92 |
| 11 | DBCH | 2 | 69 |
| 12 | DBD | 77 | 56 |
| 13 | TBE | 1 | 77 |

TABLE 22-continued

| | | Percent remaining luminescence after 2 minutes exposure to UV lamp | |
|---|---|---|---|
| Solution | Additive | Shortwave (254 nm) | Longwave (365 nm) |
| 14 | TBPA | 61 | 76 |
| 15 | Perfluoroheptane | 86 | 80 |

The results in Table 22 demonstrate that certain categories of halogenated compounds, as exemplified by DBCH and TBE, are advantageous in this invention.

EXAMPLE 3

This Example illustrates the use of certain non-ionic photoacid generators as energy active compounds. Several more representative solutions were prepared as in Example 1. Dye solutions were made by dissolving approximately 1% of the luminescent aeropium organocomplex dye Lumilux CD-331 (Honeywell Corp.) in Solution 1. To each of these dye solutions, a different energy active compound was added. These solutions are summarized in Table 23.

TABLE 23

| Solution Number | Solution 1 (% weight) | LUMILUX CD-331 (% weight) | Additive Name and Amount (% weight) |
|---|---|---|---|
| 16 | 94 | 1 | 5% [1,2,3-trismethanesulfonate]benzene (PYR-100)[a] |
| 17 | 94 | 1 | 5% diazomethane compound (DAM-301)[a] |
| 18 | 94 | 1 | 5% succinimidyl sulfonate ester (SI 105)[a] |
| 19 | 94 | 1 | 5% tris[trichloromethyl]s-triazine (TAZ 100)[a] |
| 20 | 94 | 1 | 5% sulfonated nitride (CGI-263)[b] |

[a]Midori Kogaku, Inc. Ltd.
[b]CGI-263 from Ciba Specialty Chemicals

The solutions in Table 23 were subject to the same light exposure and analyses conditions as demonstrated in Example 1. The results are given in Table 24.

TABLE 24

| | | Percent remaining luminescence after 2 minutes exposure to UV lamp | |
|---|---|---|---|
| Solution | Additive | Shortwave (254 nm) | Longwave (365 nm) |
| 2 (from Example 1) | None | 86 | 92 |
| 16 | PYR-100 | 80 | 100 |
| 17 | DAM-301 | 8 | 45 |
| 18 | SI-105 | 18 | 100 |
| 19 | TAZ-100 | 6 | 70 |
| 20 | CGI-263 | 1 | 42 |

As can be seen in Table 24, a variety of other known photoactive compounds also serve well in the present invention especially when combined with radiant energy of short wavelengths.

EXAMPLE 4

This example illustrates the use of certain europium dyes in accordance with an embodiment of the invention. Several more representative solutions were prepared as in Example 1; however, different luminescent europium organocomplex dyes were used. In each case the dye was included at the 1% by weight level. In each case, the dye solution without a photoactive compound was compared to the dye solution with tribromoethanol (TBE). As before, the Hitachi F-4500 fluorimeter was employed but using dye-specific excitation frequencies and emission frequency integration ranges. The solutions and the excitation and emission frequencies and are summarized in Table 25.

TABLE 25

| Solution Number | Solution 1 (% weight) | TBE (% weight) | Luminescent Dye Name and Amount (% weight) | Excitation wavelength (nm) | Emission wavelength region (nm) |
|---|---|---|---|---|---|
| 21a | 99 | 0 | 1% LUMILUX CDE-9411 | 362 | 600–630 |
| 21b | 94 | 5 | 1% LUMILUX CDE-9411 | 362 | 600–630 |
| 22a | 99 | 0 | 1% LUMILUX CD-332 | 362 | 600–630 |
| 22b | 94 | 5 | 1% LUMILUX CD-332 | 362 | 600–630 |
| 23a | 99 | 0 | 1% LUMILUX CD-316 | 358 | 600–630 |
| 23b | 94 | 5 | 1% LUMILUX CD-316 | 358 | 600–630 |

The solutions in Table 25 were subject to the same light exposure and analyses conditions as in Example 1. The results are given in Table 26.

TABLE 26

| Solution | TBE present? | LUMILUX Dye | Percent remaining luminescence after 2 minutes exposure to UV lamp | |
|---|---|---|---|---|
| | | | Shortwave (254 nm) | Longwave (365 nm) |
| 2 (from Example 2) | No | CD-331 | 86 | 92 |
| 13 (from Example 2) | Yes | CD-331 | 1 | 77 |
| 21a | No | CDE-9411 | 71 | 81 |
| 21b | Yes | CDE-9411 | 2 | 88 |
| 22a | No | CD-332 | 53 | 66 |
| 22b | Yes | CD-332 | 1 | 59 |
| 23a | No | CD-316 | 67 | 74 |
| 23b | Yes | CD-316 | 2 | 73 |

The data in Table 26 demonstrates that the formulations of this invention work well with a number of different varieties of europium metal organocomplex dyes.

EXAMPLE 5

This Example illustrates the use of miscellaneous fluorescent dyes in accordance with an embodiment of the invention. Several more representative solutions were prepared as in Example 4. Again, in each case the dye was included at the 1% by weight level. In each case, the dye solution without a photoactive compound was compared to the dye solution with tribromoethanol (TBE). These solutions are summarized in Table 27.

The solutions in Table 27 were subject to the same light exposure and analyses conditions as demonstrated in Example 1. The results are given in Table 28.

TABLE 28

| Solution | Initiator present? | Dye | Percent remaining luminescence after 2 minutes exposure to UV lamp | |
|---|---|---|---|---|
| | | | Shortwave (254 nm) | Longwave (365 nm) |
| 24a | No | Benzo thiazole deriv. | 100 | 92 |
| 24b | Yes | Benzo thiazole deriv. | 58 | 73 |
| 25a | No | Solvent Red 49 | 52 | 80 |
| 25b | Yes | Solvent Red | 9 | 69 |
| 26a | No | Alberta Yellow | 100 | 100 |
| 26b | Yes | Alberta Yellow | 25 | 20 |
| 27a | No | Basic Red | 92 | 100 |
| 27b | Yes | Basic Red | 30 | 27 |

The samples corresponding to Solution 28b turned from a deep magenta to nearly colorless upon irradiation for two minutes using the shortwave lamp. After four minutes of irradiation, the sample from Solution 25b turned colorless. Samples corresponding to Solution 25a retained their initial color after irradiation under the same conditions. The luminescent dye provided both an invisible, machine-readable change in luminescence and a visible change in color.

TABLE 27

| Solution Number | Solution 1 (% weight) | UVI-6976 (% weight) | TBE (% weight) | Luminescent Dye Name and Amount (% weight) | Excitation wavelength (nm) | Emission wavelength region (nm) |
|---|---|---|---|---|---|---|
| 24a | 99 | 0 | 0 | 1% benzothiazole derivative[a] | 333 | 400 to 650 |
| 24b | 94 | 0 | 5 | 1% benzothiazole derivative[a] | 333 | 400 to 650 |
| 25a | 99 | 0 | 0 | Neptune Solvent Red 49[b] | 355 | 550 to 700 |
| 25b | 94 | 0 | 5 | Neptune Solvent Red 49[b] | 355 | 550 to 700 |
| 26a | 99 | 0 | 0 | Alberta Yellow[c] | 430 | 450 to 580 |
| 26b | 94 | 5 | 0 | Alberta Yellow[c] | 430 | 450 to 580 |
| 27a | 99 | 0 | 0 | Basic Red 1[d] | 510 | 530 to 680 |

[a]Lumilux CD-333 from Honeywell, Inc.
[b]Neptune Based Red, from BASF.
[c]Soluble Toner HMS-34 from Radiant Colors, Inc.
[d]Pigment HM-13 from Radiant Colors, Inc.

EXAMPLE 6

This Example illustrates an embodiment of the present invention wherein the color change is from yellow to brown. A pigment dispersion, Solution 28, was prepared by mixing the components in the order shown in Table 29.

TABLE 29

Solution 28

| Component | Weight percentage |
|---|---|
| Acetone | 50.0 |
| Methoxyproylacetate | 20.0 |
| titanium dioxide dispersion | 30.0 | a Microlith R-K from Ciba Specialty Chemicals.

An ink, Solution 29, was prepared by mixing the components in the order shown in Table 30.

TABLE 30

Solution 29

| Component | Weight Percentage |
|---|---|
| Acetone | 46.3 |
| Tetrapropylammonium bromide | 1.7 |
| Synthetic resin SK (polyketone resin) | 15.0 |
| Solution 28 | 30.0 |
| Chrysolidine Y base (Solvent Orange 3) | 1.0 |
| Europium organocomplex LUMILUX CD-331 | 1.0 |
| 2,2,2-tribromoethanol | 5.0 |

The following properties were measured on Solution 29. The viscosity was 3.71 centipoises at 25° C. The solution resistivity was 1.520 kiloOhms centimeters. The velocity of sound was 1215 meters per second. The specific gravity was 0.982 g/mL.

A draw down sample of the ink was made on aluminum using a #8 wire wound draw down bar. A portion of the draw down was exposed for two minutes to a shortwave handheld UV lamp as described in Example 1. The exposed area turned from yellow to brown. The remaining luminescence intensity was also measured as described in Example 1. The resulting colored area had a percent remaining intensity of less than 5%.

The change in color was measured using a Macbeth calorimeter. The measurements wee acquired and converted by the instrument to the CIELAB scale, incident illumination angle 65°, observer angle of 10°, etc. Delta E for the observed color change was found to be 32.7.

The ink was printed using a Videojet EXCEL™ continuous ink jet ink printer yielding good print quality. A printed mark consisting of discrete droplets was exposed for two minutes to the handheld shortwave UV source as above. The printed mark turned brown with almost no remaining luminescence as assessed by visible inspection using the longwave setting of the handheld UV lamp as an incident light source.

EXAMPLE 7

This Example illustrates an embodiment of the present invention wherein the color change is from pink to violet. An ink composition was made in a manner similar to that in Example 6. The ink, Solution 30, was prepared by mixing the components in the order shown in Table 31.

TABLE 31

Solution 30

| Component | Weight Percentage |
|---|---|
| Acetone | 46.8 |
| Tetrapropylammonium bromide | 1.7 |
| Synthetic resin SK | 15.0 |
| Solution 31 | 30.0 |
| Pararosaniline base | 0.5 |
| LUMILUX CD-331 | 1.0 |
| 2,2,2-tribromoethanol | 5.0 |

The following properties of the ink were measured on Solution 30. The viscosity was 3.65 centipoises. The solution resistivity was 1.450 kiloOhms centimeters. The velocity of sound was 1190 meters per second. The specific gravity was 0.978 g/mL.

A draw down sample of the ink was made on aluminum using a #8 wire wound draw down bar. A portion of the draw down was exposed for twenty seconds to a shortwave handheld UV lamp as described in Example 1. The exposed area turned from pink to violet. The remaining luminescence intensity was also measured as described in Example 1. The resulting colored area had a percent remaining intensity of less than 5%. The change in color was measured as described in Example 6. Delta E for the observed color change was found to be 18.5.

The ink composition was printed using a Videojet EXCEL continuous ink jet ink printer yielding good print quality. A printed mark consisting of discrete droplets was exposed for two minutes to the handheld shortwave UV source as above. The printed mark turned violet with almost no remaining luminescence as assessed by visible inspection using the longwave setting of the handheld UV lamp as an incident light source.

EXAMPLE 8

This Example illustrates another embodiment of the invention. A solution, Solution A1, was prepared by mixing the components as shown in Table 32.

TABLE 32

Solution A1

| Component | Weight Percentage |
|---|---|
| Acetone:Duplicating Fluid #5 (4:3 mixture) | 89.9 |
| CAB 553-0.4 (Eastman Chemical) (Cellulose Acetate Butyrate) | 5.0 |
| Propyleneglycolmonomethylether acetate | 5.0 |
| Polysiloxane surfactant | 0.1 |

Duplicating Fluid #5 is denatured ethanol. The 99.0 g of Solution A1, 1.0 g of the luminescent dye LUMILUX CD-332 was added to create dyed Solution A2. Another solution, Solution A3, was made with the more lightfast dye LUMILUX CD-331 by the same procedure. To aliquots of Solutions A2 and A3, different levels of mixed aryl sulfonium salt photoinitiator UVI-6976 (Dow Chemical) were added as shown in Table 28 by diluting the overall ink A2 by 10% (Acetone was added to make up the difference in weight amounts for the 2.0, 4.0, 6.0 and 8.0% initiator inks).

TABLE 33

CAB 553-0.4 Formulations

| Solution | LUMILUX Dye | Added UVI-6976, % by weight |
|---|---|---|
| A4 | CD-332 | 2.0 |
| A5 | CD-332 | 4.0 |
| A6 | CD-332 | 6.0 |
| A7 | CD-332 | 8.0 |
| A8 | CD-332 | 10.0 |
| A9 | CD-331 | 0.27 |
| A10 | CD-331 | 0.67 |
| A11 | CD-331 | 1.0 |
| A12 | CD-331 | 1.5 |
| A13 | CD-331 | 2.0 |

EXAMPLE 9

This Example illustrates a further embodiment of the invention. A solution, Solution B1, was prepared by mixing the components as shown in Table 34.

TABLE 34

Solution B1

| Component | Weight Percentage |
|---|---|
| Acetone:Duplicating Fluid #5 (4:3 mixture) | 89.9 |
| JONCRYL 611 (Johnson Polymers) | 5.0 |
| Propyleneglycol monomethylether acetate | 5.0 |
| Polysiloxane surfactant | 0.1 |

The 99.0 g of Solution B1, 1.0 g of the photoluminescent dye Lumilux CD-331 was added to create dyed Solution B2. To aliquots of Solution B2, different levels of photoinitiator UVI-6976 (Dow Chemical) were added as shown in Table 35 by diluting the overall ink B2 by 10% (Acetone was added to make up the difference in weight amounts for the 2.0, 4.0, 6.0 and 8.0% initiator inks).

TABLE 35

JONCRYL 611 Formulations

| Solution | LUMILUX Dye | Added UVI-6976, % by weight |
|---|---|---|
| B3 | CD-331 | 0.27 |
| B4 | CD-331 | 0.67 |
| B5 | CD-331 | 1.0 |
| B6 | CD-331 | 1.5 |
| B7 | CD-331 | 2.0 |

EXAMPLE 10

This Example illustrates yet another embodiment of the invention. A solution, Solution C1, was prepared by mixing the components as shown in Table 36.

TABLE 36

Solution C1

| Component | Weight Percentage |
|---|---|
| Acetone:Duplicating Fluid #5 (3:1 mixture) | 83.0 |
| Paraloid B-66 (Rohm and Haas) | 12.0 |
| Photoinitiator UVI-6976 (Dow Chemical) | 5.0 |

To aliquots of Solution C1, colorants were added as shown in Table 37.

TABLE 37

CAB 553-0.4 Formulations

| Solution | Dye | % Dye by Weight |
|---|---|---|
| C2 | Basic Violet 4 | 1.0 |
| C3 | Solvent Orange 3 | 1.0 |
| C4 | Solvent Red 49 | 1.0 |

EXAMPLE 11

This Example illustrates some of the properties of embodiments of the invention. The solutions prepared in Examples 8, 9, and 10 were used to prepare sample for exposure to light. Draw down samples were prepared on aluminum plates. The draw downs were cut into sections to expose the samples and compare the cured samples with the initial samples. Exposures were conducted in several manners. Samples were transported in a UV curing tunnel on a transport base (Fusion Systems) while suspended 4.0 cm beneath the curing lamp. The lamp employed a 300 W/in 6 inch H-type bulb oriented perpendicular to the direction of transport. The transport was operated at a speed of 15 feet per minute. The fluorescence was quenched on samples from Examples 8 and 9; and the color changed on samples from Example 10.

EXAMPLE 12

This Example illustrates some properties of embodiments of the invention. The following formulation was employed and marked samples were made as in Examples 8–10.

TABLE 38

| Component | Weight Percentage |
|---|---|
| Acetone | 65.3 |
| Solvent Orange 3 (Keystone, Inc.) | 1.0 |
| SmartDYE ™ (PhotoSecure, Inc.)[1] | 1.0 |
| JONCRYL 611 (Johnson Wax) | 4.7 |
| Acryloid B-66 (Rohm and Haas) (acrylic resin) | 9.7 |
| VI1-0301-02 (Gibraltar Chemical Works, Inc.)[2] | 13.3 |
| Photoinitiator CGI 552 (Diaryliodonium salt, (Ciba Specialty Chemicals) | 5.0 |

[1]Believed to be an europium metal chelate complex
[2]Pigment dispersion of titanium dioxide.

The samples were tested in the same way as all the others (draw downs on aluminum and UV exposure as in Example 11) and both effects were observed after the UV exposure, namely, fluorescence was totally quenched and a significant color change from yellow to brown was observed.

EXAMPLE 13

This Example illustrates an embodiment of the present invention wherein the color change is from yellow to red and the mark resists ambient light, for example, the color change and reduction in luminescence are appreciably resistant to ambient light. This Example also illustrates an embodiment wherein the luminescent compound and the non-luminescent colorant are affected by the energy exposure. The energy active compound produces species which react to alter the emission of the luminescent compound and the absorption of the non-luminescent colorant.

An ink, Solution 14, was prepared by mixing the components in the order shown in Table 39.

TABLE 39

Solution 14

| Component | Weight Percentage |
| --- | --- |
| Primary amyl acetate | 13.6 |
| Acetone | 42.2 |
| Octylmethoxycinnemate (Escalol 557 from ISP, Inc.) | 2.0 |
| Tetrabutylammonium hexafluorophosphate | 1.2 |
| Hexabromocyclododecane | 3.0 |
| Solution 28 | 15.0 |
| Vinylpyrrolidone/vinylacetate copolymer solution (ISP E-335) | 20.0 |
| Europium organocomplex (SMARTdye ™ UR3 from Photosecure) | 1.0 |
| Solvent yellow 56 | 1.0 |
| 2,2,2-tribromoethanol | 1.0 |

The following properties were measured on Solution 31. The viscosity was 3.31 centipoises at 25° C. The solution resistivity was 911.3 Ohms-centimeters at 25° C. The velocity of sound was 1184 meters per second at 25° C. A draw down sample of the ink was made on aluminum using a #8 wire wound draw down bar. A portion of the draw down was exposed for four minutes to a shortwave (254 nm) handheld UV lamp as described in Example 1. The exposed area turned from yellow to red-brown. The remaining luminescence intensity was also measured as in Example 1. The resulting colored area had a percent remaining intensity of 11.4% of the original intensity.

The change in color was measured using a Macbeth colorimeter. The measurements were made and the data converted by the instrument to the CIELAB scale, incident illumination angle 65° and observer angle of 10°. Changes in L*, a*, b* were -13.6, 22.4 and -26.5 that indicated both a darkening of the sample and a shift in color from yellow to red. Delta E* for the observed color change was found to be 37.3.

The draw down sample was exposed to light in a fadometer used to simulate outdoor light exposure. The amount of light energy delivered to the sample was 0.4 Watts per square meter and the black panel temperature was set at 50° C. The sample was exposed for three hours and the fluorescence relative to an unexposed sample was measured. At least 50% of luminescence intensity remained and no color change was observed. Upon irradiation of the fadometer exposed sample for four minutes to a shortwave (254 nm) handheld UV lamp as described in Example 1, the color had changed from yellow to red-brown and the remaining intensity was reduced by at least 70% from the original fadometer exposed sample.

The ink was printed using a Videojet EXCEL continuous ink jet ink printer yielding good print quality. A printed mark consisting of discrete droplets was exposed for two minutes to the handheld shortwave UV source as above. The printed mark turned red with almost no remaining luminescence as assessed by visible inspection using the longwave (365 nm) setting of the handheld UV lamp as an incident light source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An ink composition comprising a luminescent compound, a volatile organic solvent, and an energy active compound, and optionally one or more non-luminescent colorants, said energy active compound, when exposed to an effective amount of energy, generates one or more acid species that react to alter a characteristic of the luminescent compound and/or a non-luminescent colorant, wherein the ink composition is an ink jet ink composition.

2. An ink composition comprising a colorant, a volatile organic solvent, and an energy active compound, said energy active compound, when exposed to an effective amount of energy, generates one or more acid species that react to alter a characteristic of the colorant, wherein the ink composition is an ink jet ink composition.

3. The ink composition of claim 2, wherein the colorant is a luminescent colorant.

4. The ink composition of claim 2, wherein the colorant is a non-luminescent colorant.

5. The ink composition of claim 1, further including a binder resin.

6. The ink composition of claim 2, further including a binder resin.

7. The ink composition of claim 1, wherein the one or more acid species react to alter an absorption characteristic of the luminescent compound.

8. The ink composition of claim 1, wherein the one or more acid species react to alter an emission characteristic of the luminescent compound.

9. The ink composition of claim 8, wherein the emission characteristic is a wavelength of emission.

10. The ink composition of claim 8, wherein the emission characteristic is an intensity of emission.

11. The ink composition of claim 10, wherein the one or more acid species react to decrease the intensity of emission.

12. The ink composition of claim 1, which includes one or more non-luminescent colorants, wherein the one or more acid species react to alter an absorption characteristic of a non-luminescent colorant.

13. The ink composition of claim 12, wherein the absorption characteristic is a wavelength of absorption.

14. The ink composition of claim 12, wherein the absorption characteristic is an intensity of absorption.

15. The ink composition of claim 2, wherein the one or more acid species react to alter an absorption characteristic of the colorant.

16. The ink composition of claim 15, wherein the absorption characteristic is a wavelength of absorption.

17. The ink composition of claim 15, wherein the absorption characteristic is an intensity of absorption.

18. The ink composition of claim 1, which includes one or more non-luminescent colorants, wherein the one or more acid species react to alter an absorption characteristic of the luminescent compound and an absorption characteristic of a non-luminescent colorant.

19. The ink composition of claim 1, which includes one or more non-luminescent colorants, wherein the one or more acid species react to alter an emission characteristic of the luminescent compound and an absorption characteristic of a non-Luminescent colorant.

20. The ink composition of claim 19, wherein the one or more acid species react to alter the intensity of emission of the luminescent compound.

21. The ink composition of claim 19, wherein the one or more acid species react to alter a wavelength of absorption of the non-luminescent colorant.

22. The nk composition of claim 19, wherein the one or more acid species react to alter an intensity of absorption of the non-luminescent colorant.

23. The ink composition of claim 1, wherein the energy active compound is an onium salt.

24. The ink composition of claim 23, wherein the onium salt comprises an element from Group V, VI, or VII of the periodic table.

25. The ink composition of claim 23, wherein the onium salt is selected from the group consisting of diazonium salts, iodonium salts having at least one aryl group, sulfonium salts having at least one aryl group, and any combination thereof.

26. The ink composition of claim 1, wherein the energy active compound is a thiophenium salt.

27. The ink composition of claim 26, wherein the thiphenium salt is arylcarbonylalkyl thiophenium salt.

28. The ink composition of claim 27, wherein the arylcarbonylalkyl thiophenium salt is selected from the group consisting of S-(2-napthalenecarbonylalkyl)-tetrahydrothiophenium p-toluenesulfonate and S-(2-napthalenecarbonylmethyl)-tetrahydrothiophenium trifluoromethanesulfonate.

29. The ink composition of claim 1, wherein the energy active compound is selected from the group consisting of diazomethane compounds, triazine derivatives substituted at one or more of 2, 4, and 6 positions of the triazine ring with $MX_3$ where X is a halogen atom and M is a carbon atom, and any combination thereof.

30. The ink composition of claim 29, wherein the triazine derivative is tris[trichloromethyl]s-triazine.

31. The ink composition of claim 1, wherein the energy active compound comprises a photoabsorbing fragment and a sulfonate, tosylate or triflate group attached thereto.

32. The ink composition of claim 31, wherein the energy active compound is selected from the group consisting of N-hydroxynaphthalimide triflates, N-hydroxy-5-norbornene-2,3-dicarboximide sulfonates, N-hydroxyphthalinide triflates, naphthalimidyl sulfonates, succinimidyl sulfonates, and benzoin tosylates.

33. The ink composition of claim 1, wherein the energy active compound is a halogenated hydrocarbon comprising (1) at least two carbon atoms designated carbons 1 and 2 where carbon 1 and carbon 2 are bound together and at least two halogen atoms are directly bound to a carbon 1 and carbon 2 is directly bound to cyano, hydroxy, fluoride, chloride, bromide, iodide, phosphonate, or sulfonate; or (2) at least three sequentially adjoined carbon atoms designated 1, 2, and 3, wherein at least one halogen atom is bound to carbon 1 and at least one halogen atom is bound to adjacent carbon 2.

34. The ink composition of claim 33, wherein the energy active compound is selected from the group consisting of 1,2,5,6,9,10-hexabromocyclododecane, 2,2,2-tribromoethanol, 1,2-dibromocyclohexane, 2,3-tribromopropionitrile, benzylbromoacetate, bronioacetic acid, bromoacetyl bromide, 2-bromobutyric acid, 2-bromopropionic acid, 2,3-dibromopropane-1-ol, ethyl bromoacetate, and 1,1,2,2-tetrabromoethane, and any combination thereof.

35. The ink composition of claim 1, wherein the energy is light, heat, electron beam, or any combination thereof.

36. The ink composition of claim 1, wherein the luminescent compound emits in the ultraviolet (UV) region.

37. The ink composition of claim 1, wherein the luminescent compound emits in the visible region.

38. The ink composition of claim 1, wherein the luminescent compound emits in the infrared (TR) region.

39. The ink composition of claim 3, wherein the luminescent colorant emits in the UV region.

40. The ink composition of claim 3, wherein the luminescent colorant emits in the visible region.

41. The ink composition of claim 3, wherein the luminescent colorant emits in the IR region.

42. The ink composition of claim 1, wherein the volatile organic solvent is selected from the group consisting of alcohols, ketones, cyclic ketones, esters, ethers, and any combination thereof.

43. The ink composition of claim 1, wherein the volatile organic solvent is selected from the group consisting of methanol, ethanol, n-propanol, isopropanol, butanol, acetone, methyl ethyl ketone, ethyl acetate, n-propyl acetate, isopropyl acetate, cyclohexanone, and any combination thereof.

44. The ink composition of claim 5, wherein the binder resin is a thermoplastic resin.

45. The ink composition of claim 5, wherein the binder resin is selected from the group consisting of amides, urethanes, esters, epoxy resins, ketone resins, vinylpyrrolidone polymers, vinyl polymers, vinylbutyral polymers, acrylics, styrene/acrylics, cellulosics, nitrocellulose, phenolic resins, hydroxystyrene polymers, vinyl alcohol polymers, styrene allyl alcohol polymers, and any combination thereof.

46. The ink composition of claim 2, wherein the energy active compound is an onium salt.

47. The ink composition of claim 46, wherein the onium salt comprises an element from Group V, VI, or VII of the periodic table.

48. The ink composition of claim 46, wherein the onium salt is selected from the group consisting of diazonium salts, iodonium salts having at least one aryl group, sulfonium salts having at least one aryl group, and any combination thereof.

49. The ink composition of claim 2, wherein the energy active compound is a thiophenium salt.

50. The ink composition of claim 49, wherein the thiophenium salt is arylcarbonylalkyl thiophenium salt.

51. The ink composition of claim 50, wherein the arylcarbonylalkyl thiophenium salt is selected from the group consisting of S-(2-napthalenecarbonylmethyl) -tetrahydrothiophenium p-toluenesulfonate and S-(2-napthalenecarbonylmethyl) -tetrahydrothiophenium trifluoromethanesulfoate.

52. The ink composition of claim 2, wherein the energy active compound is selected from the group consisting of diazomethane compounds, triazine derivatives substituted at one or more of 2, 4, and 6 positions of the triazine ring with $MX_3$ where X is a halogen atom and M is a carbon atom, and any combination thereof.

53. The ink composition of claim 52, wherein the triazine derivative is tris[trichloromethyl]s-triazine.

54. The ink composition of claim 2, wherein the energy active compound comprises a photoabsorbing fragment and a sulfonate, tosylate or inflate group attached thereto.

55. The ink composition of claim 54, wherein the energy active compound is selected from the group consisting of N-hydroxynaphthalimide triflates, N-hydroxy-5-norborne-2,3-dicarboximide sulfonates, N-hydroxyphtbalimide triflates, naphthalimidyl sulfonates, succinimidyl sulfonates, and benzoin tosylates.

56. The ink composition of claim 2, wherein the energy active compound is a halogenated hydrocarbon comprising (1) at least two carbon atoms designated carbons 1 and 2 where carbon 1 and carbon 2 are bound together and at least two halogen atoms are directly bound to a carbon 1 and carbon 2 is directly bound to cyano, hydroxy, fluoride, chloride, bromide, iodide, phosphonate, or sulforuate; or (2) at least three sequentially adjoined carbon atoms designated 1, 2, and 3, wherein at least one halogen atom is bound to carbon 1 and at least one halogen atom is bound to adjacent carbon 2.

57. The ink composition of claim 56, wherein the energy active compound is selected from the group consisting of I,2,5,6,9,10-hexabromocyclodOd8Cafle, 2,2,2-tribromoethanol, 1,2-dibromocyclohexane, 2,3-tribromopropionitrile, benzylbromoacetate, bromoacetic acid, bromoacetyl bromide, 2-bromobutyric acid, 2-bromopropionic acid, 2,3-dibromopropane-1-ol, ethyl bromoacetate, and 1,1,2,2-tetrabromoetbane, and any combination thereof.

58. The ink composition of claim 2, wherein the energy is light, heat, electron beam, or any combination thereof.

59. The ink composition of claim 2, wherein the volatile organic solvent is selected from the group consisting of alcohols, ketones, cyclic ketones, esters, ethers, and any combination thereof.

60. The ink composition of claim 2, wherein the volatile organic solvent is selected from the group consisting of methanol, ethanol, n-propanol, isopropanol, butanol, acetone, methyl ethyl ketone, ethyl acetate, n-propyl acetate, isopropyl acetate, cyclohexanone, and any combination thereof.

61. The ink composition of claim 6, wherein the binder resin is a thermoplastic resin.

62. The ink composition of claim 6, wherein the binder resin is selected from the group consisting of amides, urethanes, esters, epoxy resins, ketone resins, vinylpyrrolidone polymers, vinyl polymers, vinylbutyral polymers, acrylics, styrene/acrylics, cellulosics, nitrocellulose, phenolic resins, hydroxystyrene polymers, vinyl alcohol polymers, styrene allyl alcohol polymers, and any combination thereof.

63. The ink composition of claim 1, wherein the luminescent compound is a luminescent colorant.

64. The ink composition of claim 1, wherein the luminescent compound is a luminescent colorless compound.

65. The ink composition of claim 64, further including a binder resin.

66. The ink composition of claim 64, wherein the one or more acid species react to alter an absorption characteristic of the luminescent colorless compound.

67. The ink composition of claim 64, wherein the one or more acid species react to alter an emission characteristic of the luminescent colorless compound.

68. The ink composition of claim 67, wherein the emission characteristic is a wavelength of emission.

69. The ink composition of claim 67, wherein the emission characteristic is an intensity of emission.

70. The ink composition of claim 67, wherein the one or more acid species react to decrease the intensity of emission.

71. The ink composition of claim 64, wherein the energy active compound is an onium salt.

72. The ink composition of claim 71, wherein the onium salt comprises an element from Group V, VI, or VII of the periodic table.

73. The ink composition of claim 71, wherein the onium salt is selected from the group consisting of diazoniuni salts, iocloniuni salts having at least one aryl group, sulfonium salts having at least one aryl group, and any combination thereof.

74. The ink composition of claim 64, wherein the energy active compound is a thiophenium salt.

75. The ink composition of claim 74, wherein the thiophenium salt is arylcarbonylalkyl thiophenium salt.

76. The ink composition of claim 75, wherein the arylcarbonylalkyl thiophenium salt is selected from the group consisting of S-(2-napthalenecarbonylmethyl) -tetrahydrothiophenium p-toluenesulfonate and S-(2-napthalenecarbonylmethyl) -tetrahydrothiophenium trifluoromethanesulfonate.

77. The ink composition of claim 64, wherein the energy active compound is selected from the group consisting of diazomethane compounds, triazine derivatives substituted at one or more of 2, 4, and 6 positions of the triazine ring with $MX_3$ where X is a halogen atom and M is a carbon atom, and any combination thereof.

78. The ink composition of claim 77, wherein the triazine derivative is tris[trichloromethyl]s-triazine.

79. The ink composition of claim 64, wherein the energy active compound comprises a photoabsorbing fragment and a sulfonate, tosylate or triflate group attached thereto.

80. The ink composition of claim 79, wherein the energy active compound is selected from the group consisting of N-hydroxynaphthalimide triflates, N-hydroxy-5-norbornene-2,3-dicarboximide sulfonates, N-hydroxyphthalimide triflates, naphthalimidyl sulfonates, succinimidyl sulfonates, and benzoin tosylates.

81. The ink composition of claim 64, wherein the energy active compound is a halogenated hydrocarbon comprising (1) at least two carbon atoms designated carbons 1 and 2 where carbon 1 and carbon 2 are bound together and at least two halogen atoms are directly bound to a carbon 1 and carbon 2 is directly bound to cyano, hydroxy, fluoride, chloride, bromide, iodide, phosphonate, or sulfonate; or (2) at least three sequentially adjoined carbon atoms designated 1, 2, and 3, wherein at least one halogen atom is bound to carbon 1 and at least one halogen atom is bound to adjacent carbon 2.

82. The ink composition of claim 81, wherein the energy active compound is selected from the group consisting of 1,2,5,6,9,10-hexabromocyclododecane, 2,2,2-tribromoethanol, 1,2-dibromocyclohexane, 2,3-tribromopropionitrile, beazylbromoacetate, bromoacetic acid, bromoacetyl bromide, 2-bromobutyric acid, 2-bromopropionic acid, 2,3-dibromopropane-1-ol, ethyl bromoacetate, and 1,1,2,2-tetrabromoethane, and any combination thereof.

83. The ink composition of claim 64, wherein the energy is light, heat, electron beam, or any combination thereof.

84. The ink composition of claim 83, wherein the volatile organic solvent is selected from the group consisting of alcohols, ketones, cyclic ketones, esters, ethers, and any combinations thereof.

85. The ink composition of claim 83, wherein the volatile organic solvent is selected from the group consisting of methanol, ethanol, n-propanol, isopropanol, butanol, acetone, methyl ethyl ketone, ethyl acetate, n-propyl acetate, isopropyl acetate, cyclohexanone, and any combinations thereof.

86. The ink composition of claim 1, further including one or more additives selected from the group consisting of humectants, plasticizers, light blockers, surfactants, wetting agents, heat stabilizers, biocides, adhesion promoters, and conductivity agents, and any combination thereof.

87. The ink composition of claim 2, further including one or more additives selected from the group consisting of humectants, plasticizers, light blockers, surfactants, wetting agents, heat stabilizers, biocides, adhesion promoters, and conductivity agents, and any combination thereof.

88. The ink composition of claim 1, which has a viscosity of from about 1.6 centipoises (cps) to about 7 cps at 25° C., an electrical resistivity of from about 50 ohm-cm to about 2,000 ohm-cm, and a sonic velocity of from about 1100 meters/second to about 1700 meters/second.

89. The ink composition of claim 2, which has a viscosity of from about 1.6 centipoises (cps) to about 7 cps at 25° C., an electrical resistivity of from about 50 ohm-cm to about 2,000 ohm-cm, and a sonic velocity of from about 1100 meters/second to about 1700 rneters/second.

90. The ink composition of claim 1, which has a viscosity from about 4 cps to about 120 cps at 25° C., an electrical resistivity greater than about 3 Kohms-cm, and a surface tension from about 25 to about 38 dynes/cm at 25° C.

91. The ink composition of claim 2, which has a viscosity from about 4 cps to about 120 cps at 25° C., an electrical resistivity greater than about 3 Kohms-cm, and a surface tension from about 25 to about 38 dynes/cm at 25° C.

92. The ink composition of claim 1, which has an electrical resistivity greater than about 3 Kohms-cm and a surface tension of from about 25 to about 38 dynes/cm at 25° C.

93. The ink composition of claim 92, which has a viscosity of from about 3 cps to about 30 cps at a temperature of from 25 to 70° C.

94. The ink composition of claim 2, which has an electrical resistivity greater than about 3 Kohms-cm and a surface tension of from about 25 to about 38 dynes/cm at 25° C.

95. The ink composition of claim 94, which has a viscosity of from about 3 cps to about 30 ops at a temperature of from 25 to 70° C.

96. A process for authenticating a substrate comprising: (a) providing an authenticating mark on the substrate using the ink composition of claim 1; (b) reading said authenticating mark; (c) exposing said authenticating mark to an effective amount of energy to generate species that react with said luminescent compound and/or non-luminescent colorant(s) to obtain an energy-exposed authenticating mark; and (d) reading the energy-exposed authenticating mark.

97. A process for authenticating a substrate comprising: (a) providing an authenticating mark on the substrate using the ink composition of claim 2; (b) reading said authenticating mark; (c) exposing said authenticating mark to an effective amount of energy to generate species that react with said colorant to obtain an energy-exposed authenticating mark; and (d) reading the energy-exposed authenticating mark.

98. A process for authenticating a substrate comprising: (a) providing an authenticating mark on the substrate using the ink composition of claim 1; (b) reading said authenticating mark; (c) exposing said authenticating mark to an effective amount of energy to generate species that react with said non-luminescent colorant to obtain an energy-exposed authenticating mark; and (d) reading the energy-exposed authenticating mark.

99. A system for authenticating a substrate comprising: (a) the ink composition of claim 1; (b) an ink jet printer; (c) a substrate; (d) a deactivation energy source; and (e) a reading device.

100. A system for authenticating a substrate comprising: (a) the ink composition of claim 2; (b) an inkjet printer; (c) a substrate; (d) a deactivation energy source; and (e) a reading device.

101. An ink jet ink composition comprising a first colorant which is fluorescent, a second colorant which is pH sensitive, a solvent a binder resin, and a photoactive acid-releasing compound.

102. The ink composition of claim 6, wherein the colorant is a fluorescent colorant and the energy active compound is a photoactive acid-releasing compound.

103. The ink composition of claim 3, wherein the luminescent colorant is selected from the group consisting of anthracene, furan, thiophene, nitrobenzene, cyanines, xanthenes acridines, phenazines, napthols, porphyrins, coumarins, pyrromethenes, and oxazines, and any combination thereof.

104. The ink composition of claim 103, wherein the xanthene is fluorescein or rhodamine.

105. The ink composition of claim 103, wherein the acridine is euchrysine.

106. The ink composition of claim 103, wherein the phenazine is safranine.

107. The ink composition of claim 1, wherein the luminescent compound is a dye.

108. The ink composition of claim 107, wherein the dye is selected from the group consisting of C.I. Solvent Red 49, fluorescent metal complex azo dyes, and fluorescent azo dyes, and any combination thereof.

109. The ink composition of claim 108, wherein the fluorescent metal complex azo dye is aluminum:acid Alizarin Garnet R.

110. The ink composition of claim 108, wherein the fluorescent azo dye is 4-dimethylamino-N-benzylidene-4'-nitroaniline.

111. The ink composition of claim 1, wherein the luminescent compound is a rare earth metal chelate complex.

112. The ink composition of claim 111, wherein the rare earth metal is a lanthanide.

113. The ink composition of claim 112, wherein the rare earth metal is Eu.

114. The ink composition of claim 1, which includes one or more non-luminescent colorants, wherein the acid species react to alter the absorption or emission characteristic of a non-luminescent colorant such that the altered absorption or emission characteristic of the non-luminescent colorant overlaps or coincides with the absorption or emission characteristic of the luminescent compound.

115. The ink composition of claim 1, which includes an additional non-luminescent colorant to provide a visible color or to alter a luminescent property of the luminescent compound.

116. The ink composition of claim 115, wherein the additional non-luminescent colorant is titanium dioxide.

117. The ink composition of claim 1, which includes one or more non-luminescent colorants, wherein at least one of the non-luminescent colorants is one that changes color if the pH of its environment is changed.

118. The ink composition of claim 117, wherein the at least one of the non-luminescent colorants exhibits a color change under acidic conditions.

119. The ink composition of claim 117, wherein the at least one of the non-luminescent colorants is a triarylmethane dye, a xanthene dye, or an azo dye.

120. The ink composition of claim 119, wherein the triarylmethane dye is C.I. Basic Violet 4.

121. The ink composition of claim 119, wherein the xanthene dye is C.I. Solvent Red 49.

122. The ink composition of claim 119, wherein the azo dye is C.I. Solvent Orange 3.

123. The ink composition of claim 117, wherein the at least one of the non-luminescent colorants is selected from the group consisting of anthraquinones, diphenylmethanes, thiazines, oxazines, azines, pyronines, thiopyronines, acridines, polymethine, indigoid, nitro, and nitroso dyes, and any combination thereof.

124. The ink composition of claim 1, wherein the energy active compound is a photoinitiator.

125. The ink composition of claim 2, wherein the energy active compound is a photoinitiator.

126. The ink composition of claim 5, which contains the volatile organic solvent in an amount of from about 30 to about 95% by weight, the binder resin in an amount of from 0.01 to about 30% by weight, the luminescent compound in an amount of from about 0.01 to about 10% by weight, a non-luminescent colorant in an amount of from 0 to about 10% by weight, and the energy active compound in an amount of from about 0.1% to about 15% by weight.

127. The ink composition of claim 126, wherein the volatile organic solvent is acetone.

128. The ink composition of claim 126, wherein the binder resin is a polyketone resin.

129. The ink composition of claim 126, wherein the luminescent compound is a phosphorescent dye comprising europium.

130. The ink composition of claim 126, wherein the non-luminescent colorant is an azo dye.

131. The ink composition of claim 130, wherein the azo dye is chrysolidine Y base.

132. The ink composition of claim 126, wherein the energy active compound is reactive toward UVC radiation and is soluble in the solvent.

133. The ink composition of claim 126, wherein the energy active compound is tribromoethanol.

134. The ink composition of claim 126, which further includes a conductivity agent in an amount of from about 0.5 to about 5% by weight of the ink composition.

135. The ink composition of claim 134, wherein the conductivity agent is tetrapropylammonium bromide.

136. The ink composition of claim 19, wherein the luminescent compound is a europium metal chelate complex and the non-luminescent colorant is Solvent Yellow 56.

137. An ink composition comprising a colorant, a solvent, and a photoinitiator, said photoinitiator, when exposed to an effective amount of energy, generates one or more acid species that react to alter a characteristic of the colorant, wherein the ink composition is an ink jet ink composition.

138. An ink composition comprising a colorant, a solvent, and an energy active compound, said energy active compound, when exposed to an effective amount of energy, generates one or more acid species that react to alter an intensity of absorption of the colorant, wherein the ink composition is an ink jet ink composition.

139. An ink composition comprising a luminescent colorant, a solvent, and an energy active compound, said an energy active compound, when exposed to an effective amount of energy, generates one or more acid species that react to alter a characteristic of the luminescent colorant wherein the ink composition is an ink jet ink composition, and the luminescent colorant emits in the IR region.

140. The ink composition of claim 139, wherein the luminescent colorant is selected from the group consisting of cyanines, porphyrins, and oxazines, and any combination thereof.

* * * * *

UNITED STATES PATENT AND TRADEMARK OFFICE
CERTIFICATE OF CORRECTION

| | |
|---|---|
| PATENT NO. | : 7,147,801 B2 |
| APPLICATION NO. | : 10/800426 |
| DATED | : December 12, 2007 |
| INVENTOR(S) | : Michael Kozee, Steven D. Looman and John P. Folkers |

It is certified that error appears in the above-identified patent and that said Letters Patent is hereby corrected as shown below:

Claim 19, Column 43, Line 44: "non-Luminescent" should read --non-luminescent--.

Claim 22, Column 43, Line 51: "The nk" should read --The ink--.

Claim 28, Column 44, Line 3: "2-napthalenecarbonylalkyl" should read --2-napthalenecarbonylmethyl--.

Claim 32, Column 44, Lines 21-22: "N-hydroxyphthaliinide" should read --N-hydroxyphthalimide--.

Claim 34, Column 44, Line 38: "bronioacetic" should read --bromoacetic--.

Claim 38, Column 44, Line 50: "(TR)" should read -- (IR)--.

Claim 51, Column 45, Line 30: "sulfoate" should read --sulfonate--.

Claim 54, Column 45, Line 42: "inflate" should read --triflate--.

Claim 56, Column 45, Line 55: "sulforuate" should read --sulfonate--.

Claim 57, Column 45, Line 62: "hexabromocyclodOd8Cafle" should read --hexabromocyclododecane--.

Claim 57, Column 45, Line 67: "rabromoetbane" should read --rabromoethane--.

Claim 73, Column 46, Line 48: "diazoniuni" should read --diazonium--.

Claim 82, Column 47, Line 27: "beazylbromoacetate" should read --benzylbromoacetate--.

UNITED STATES PATENT AND TRADEMARK OFFICE
CERTIFICATE OF CORRECTION

PATENT NO.       : 7,147,801 B2
APPLICATION NO.  : 10/800426
DATED            : December 12, 2007
INVENTOR(S)      : Michael Kozee, Steven D. Looman and John P. Folkers Page 2 of 2

It is certified that error appears in the above-identified patent and that said Letters Patent is hereby corrected as shown below:

Claim 95, Column 48, Line 17: "30 ops" should read --30 cps--.

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

PATENT NO.         : 7,147,801 B2
APPLICATION NO. : 10/800426
DATED                  : December 12, 2006
INVENTOR(S)       : Michael Kozee, Steven D. Looman and John P. Folkers It is certified that error appears in the above-identified patent and that said Letters Patent is hereby corrected as shown below:

Claim 19, Column 43, Line 44: "non-Luminescent" should read --non-luminescent--.

Claim 22, Column 43, Line 51: "The nk" should read --The ink--.

Claim 28, Column 44, Line 3: "2-napthalenecarbonylalkyl" should read --2-napthalenecarbonylmethyl--.

Claim 32, Column 44, Lines 21-22: "N-hydroxyphthaliinide" should read --N-hydroxyphthalimide--.

Claim 34, Column 44, Line 38: "bronioacetic" should read --bromoacetic--.

Claim 38, Column 44, Line 50: "(TR)" should read -- (IR)--.

Claim 51, Column 45, Line 30: "sulfoate" should read --sulfonate--.

Claim 54, Column 45, Line 42: "inflate" should read --triflate--.

Claim 56, Column 45, Line 55: "sulforuate" should read --sulfonate--.

Claim 57, Column 45, Line 62: "hexabromocyclodOd8Cafle" should read --hexabromocyclododecane--.

Claim 57, Column 45, Line 67: "rabromoetbane" should read --rabromoethane--.

Claim 73, Column 46, Line 48: "diazoniuni" should read --diazonium--.

Claim 82, Column 47, Line 27: "beazylbromoacetate" should read --benzylbromoacetate--.

UNITED STATES PATENT AND TRADEMARK OFFICE
CERTIFICATE OF CORRECTION

PATENT NO. : 7,147,801 B2
APPLICATION NO. : 10/800426
DATED : December 12, 2006
INVENTOR(S) : Michael Kozee, Steven D. Looman and John P. Folkers It is certified that error appears in the above-identified patent and that said Letters Patent is hereby corrected as shown below:

Claim 95, Column 48, Line 17: "30 ops" should read --30 cps--.

This certificate supersedes Certificate of Correction issued May 8, 2007.

Signed and Sealed this

Twenty-ninth Day of May, 2007

JON W. DUDAS
*Director of the United States Patent and Trademark Office*